(12) United States Patent
Mandeville-Clarke

(10) Patent No.: US 10,127,818 B2
(45) Date of Patent: Nov. 13, 2018

(54) SYSTEMS AND METHODS FOR DETECTING AND AVOIDING AN EMERGENCY VEHICLE IN THE PROXIMITY OF A SUBSTANTIALLY AUTONOMOUS VEHICLE

(71) Applicant: Ben Mandeville-Clarke, Tinbeerwah (AU)

(72) Inventor: Ben Mandeville-Clarke, Tinbeerwah (AU)

(73) Assignee: Clear Commute Ventures Pty Ltd, Brisbane (AU)

( * ) Notice: Subject to any disclaimer, the term of this patent is extended or adjusted under 35 U.S.C. 154(b) by 0 days.

(21) Appl. No.: 15/626,077

(22) Filed: Jun. 17, 2017

(65) Prior Publication Data
US 2018/0233047 A1    Aug. 16, 2018

(30) Foreign Application Priority Data

Feb. 11, 2017    (AU) ................................ 2017900438

(51) Int. Cl.
| | |
|---|---|
| G05D 1/02 | (2006.01) |
| G06F 17/10 | (2006.01) |
| G06G 7/78 | (2006.01) |
| G08G 1/16 | (2006.01) |
| G01S 13/93 | (2006.01) |
| G05D 1/00 | (2006.01) |

(52) U.S. Cl.
CPC ............ *G08G 1/166* (2013.01); *G01S 13/931* (2013.01); *G05D 1/0088* (2013.01); *G01S 2013/9325* (2013.01); *G01S 2013/9342* (2013.01); *G08G 1/16* (2013.01); *G08G 1/163* (2013.01)

(58) Field of Classification Search
USPC ............................................................ 701/3
See application file for complete search history.

(56) References Cited

U.S. PATENT DOCUMENTS

| | | | | |
|---|---|---|---|---|
| 5,298,905 | A | * | 3/1994 | Dahl ........................ G01S 7/34 342/118 |
| 6,038,501 | A | | 3/2000 | Kawakami |
| 6,142,252 | A | | 7/2000 | Kinto et al. |
| 6,370,452 | B1 | | 3/2002 | Pfister |

(Continued)

FOREIGN PATENT DOCUMENTS

DE    102013219038 A1 *    3/2015

OTHER PUBLICATIONS

Komar english translation from google patents.*

*Primary Examiner* — Jean Paul Cass

(57) ABSTRACT

Systems and methods for identifying that an emission received or captured from the external environment, or a received electromagnetic signal carrying a data, indicates an emergency vehicle in proximity to a substantially autonomous vehicle and that the emergency vehicle occupies a relative position and/or navigating a relative speed such that the substantially autonomous vehicle is a current or future obstruction for the emergency vehicle. A system comprising at least an aspect of the substantially autonomous vehicle is capable of causing the maneuver of the substantially autonomous vehicle to a position, such that substantially autonomous vehicle is not obstructing the emergency vehicle when at the position.

3 Claims, 7 Drawing Sheets

(56) References Cited

U.S. PATENT DOCUMENTS

| | | | |
|---|---|---|---|
| 7,692,125 B1* | 4/2010 | Williams | F42B 15/01 |
| | | | 244/3.1 |
| 8,508,721 B2* | 8/2013 | Cates | G01P 3/366 |
| | | | 356/5.1 |
| 8,781,669 B1* | 7/2014 | Teller | G05D 1/021 |
| | | | 700/245 |
| 8,880,347 B1* | 11/2014 | Hightower | G09B 29/106 |
| | | | 701/533 |
| 9,176,500 B1* | 11/2015 | Teller | G05D 1/0088 |
| 9,235,211 B2 | 1/2016 | Davidsson et al. | |
| 9,373,149 B2 | 6/2016 | Abhyanker | |
| 9,682,704 B2* | 6/2017 | Teller | G05D 1/0088 |
| 9,701,307 B1* | 7/2017 | Newman | B60W 30/09 |
| 2010/0006760 A1* | 1/2010 | Lee | G01N 21/3504 |
| | | | 250/338.5 |
| 2014/0046530 A1* | 2/2014 | Humphrey | B62D 15/025 |
| | | | 701/26 |
| 2014/0297174 A1* | 10/2014 | Tomizawa | G01C 21/365 |
| | | | 701/408 |
| 2014/0303882 A1* | 10/2014 | Jang | G08G 1/166 |
| | | | 701/119 |
| 2016/0252905 A1 | 9/2016 | Tian et al. | |
| 2017/0039765 A1* | 2/2017 | Zhou | G06T 19/006 |
| 2018/0043887 A1* | 2/2018 | Newman | B60W 30/09 |

\* cited by examiner

SYSTEMS AND METHODS FOR DETECTING AND AVOIDING AN EMERGENCY VEHICLE IN THE PROXIMITY OF A SUBSTANTIALLY AUTONOMOUS VEHICLE

| U.S. PATENT PRIOR ART REFERENCES | | |
|---|---|---|
| 6,038,501 A | March 2000 | Kawakami |
| 6,142,252 A | November 2000 | Kinto et al. |
| 6,370,452 B1 | April 2002 | Pfister |
| 9,235,211 B2 | January 2016 | Davidsson et al. |
| 9,373,149 B2 | June 2016 | Abhyanker |

CROSS REFERENCE TO RELATED APPLICATIONS

This application claims the benefit of foreign priority to A.U.S. provisional patent application Ser. No. 2017900438 filed 11 Feb. 2017. The contents of the prior applications mentioned above are incorporated herein by reference in their entirety.

FIELD OF THE DISCLOSURE

The embodiments of the present disclosure relates to autonomous vehicles, and more specifically to novel control and communications technologies for one or more autonomous vehicles.

BACKGROUND

Autonomous vehicles, such as vehicles which do not require a human driver, may be used to aid in the transport of passengers or items from one location to another. An important component of an autonomous vehicle is the perception system, which allows the vehicle to perceive and interpret its surroundings using cameras, radar, sensors, receivers, transmitters, transceivers, and other similar devices. The perception system executes numerous decisions while the autonomous vehicle is in motion, such as speeding up, slowing down, stopping, turning, etc. Autonomous vehicles may also use the cameras, sensors, receivers, transmitters, transceivers, and global positioning devices to gather and interpret images and sensor data about its surrounding environment, e.g., oncoming vehicles, parked cars, trees, buildings, etc.

SUMMARY OF THE PRESENT DISCLOSURE

In an aspect of the present disclosure, an aspect of a system coupled to, attached to, communicatively coupled to, or integrated with a substantially autonomous vehicle is operable to receive and process a request to navigate to a first-pre-determined location. The processing of the request may comprise performing path planning, mapping, positional localization, and the like. While navigating to the first location, the at least the aspect of the computing system is operable to receive and process an interruption signal, wherein the interruption signal interrupts the requirement for the substantially autonomous vehicle to navigate to the first pre-determined location wherein the substantially autonomous vehicle is positionally located further than a distance from the first pre-determined location. The aspect of the system is operable to perform a path planning distinct from the path planning performed to navigate to the first location.

In another aspect of the present disclosure, the aspect of the system coupled to, attached to, communicatively coupled to, or integrated with a substantially autonomous vehicle is operable to receive and process a request to navigate to a second pre-determined location. The processing of the request may comprise performing path planning, mapping, positional localization, and the like. While navigating to the second location, the aspect of the computing system is operable to receive empirical data comprising one or more emissions and further analyse an aspect of the empirical data, wherein the analysis is based at least in part on reference data stored in a non-transient computer-readable storage medium, wherein the reference data is pre-programmed and/or stored in memory based on one or more learning algorithms. The aspect of the system is operable to identify that one or more emissions comprising the empirical data correlates with an emergency vehicle and that the emergency vehicle occupies a position and/or navigating at a speed such that the substantially autonomous vehicle is a current or future obstruction for the emergency vehicle. The aspect of the system is operable to manoeuvre the substantially autonomous vehicle, such that substantially autonomous vehicle is not obstructing the emergency vehicle after the manoeuvre.

In another aspect of the present disclosure, the aspect of the system coupled to, attached to, communicatively coupled to, or integrated with a substantially autonomous vehicle is operable to receive and process a request to navigate to a second pre-determined location. The processing of the request may comprise performing path planning, mapping, positional localization, and the like. While navigating to the second pre-determined location, the at least the aspect of the system is operable to receive and process an electromagnetic signal, wherein the electromagnetic signal comprises data comprising at least one of an alert to perform a navigational manoeuvre to avoid obstructing an emergency vehicle, a position of the emergency vehicle, a parameter of the emergency vehicle, a path planning data, and/or a speed of the emergency vehicle. The aspect of the system is operable to manoeuvre the substantially autonomous vehicle, such that substantially autonomous vehicle is not obstructing the emergency vehicle after the manoeuvre. The embodiments of the present disclosure are not meant to limit the spirit and scope of the present disclosure.

BRIEF SUMMARY OF THE FIGURES

The concepts described herein are illustrated by way of example and not by way of limitation in the accompanying figures. For simplicity and clarity only the most pertinent aspects and elements to the embodiments of the present disclosure are presented. Where considered appropriate, reference labels have been repeated among the figures to indicate corresponding or analogous elements or aspects.

DESCRIPTION OF THE EMBODIMENTS

Figure 1A:
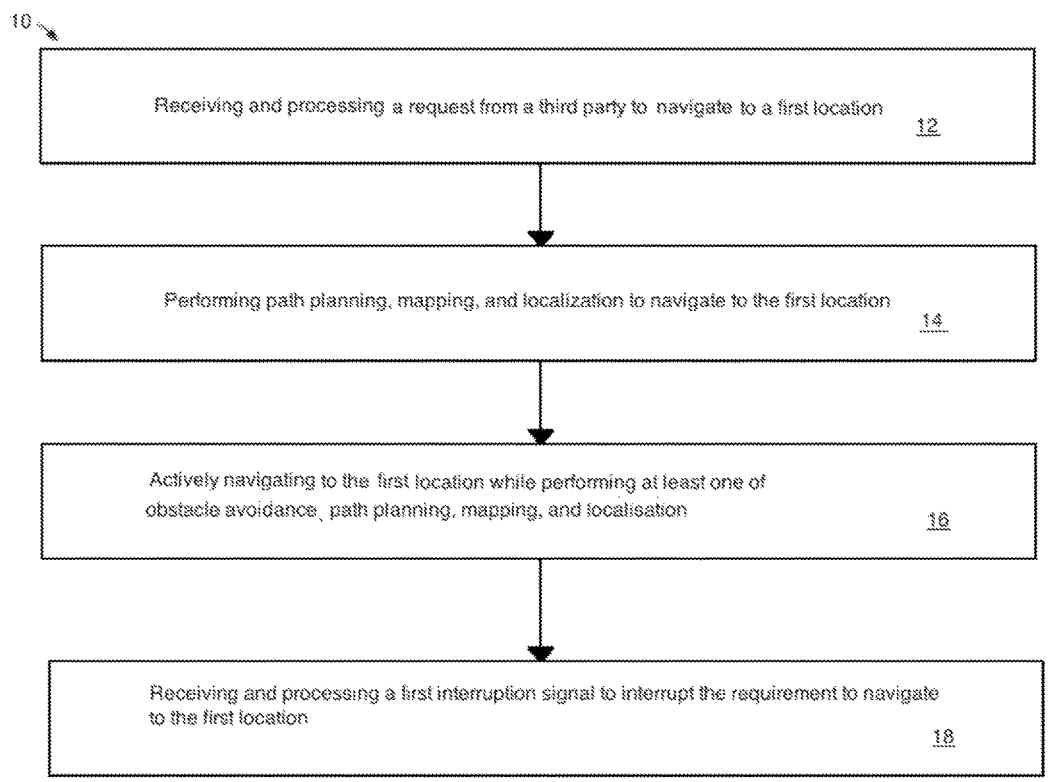
FIG. 1a shows a flow diagram of a process method of the present disclosure.

The present disclosure is at least in part directed to determining that an emergency vehicle is in proximity with a substantially autonomous vehicle and determining an appropriate response, if necessary, in order to ensure the substantially autonomous vehicle does not substantially obstruct the efficient navigation of the emergency vehicle. The present disclosure is directed to determining and responding to the emergency vehicle within a radius of the substantially autonomous vehicle, wherein the substantially autonomous vehicle is traveling to a second pre-determined location and wherein the determining and, if necessary, the response is processed and executed prior to the substantially autonomous vehicle navigating to a position that is less than or equal to 20.2 meters to 22.5 meters of the second pre-determined location (although this may not be determined by an algorithm to ensure full compliance). Facilitating and enabling the aims, spirit and scope of the present disclosure may involve a substantially autonomous vehicle engaging a perception, sensor, mapping and/or imaging system, transceiver, receiver, transmitter, combinations thereof, and the like, and/or some derivative or equivalent thereof, in order to capture images or otherwise a perception or determination of the external environment surrounding the substantially autonomous vehicle. This process may occur once or iteratively in an arbitrary manner, or according to a pre-determined execution of programmatic instructions. The captured images or other perception/empirical data on the environment external to the substantially autonomous vehicle may be analysed by one or more process methods and compared to one or more reference images, reference data, and/or other perception/empirical data. Specifically, the analysis and comparison may correlate the captured empirical data images and/or other perception empirical data with at least one of pre-defined shapes, pre-defined orientations, light emission schemes, thermal radiation emission schemes, radar aspects, infrared emission schemes, electromagnetic emission schemes, audio emission schemes, vibration emission schemes, ultrasound emission schemes, sonar emission schemes and/or other emission schemes stored as one or more references for one or more emergency vehicles in a non-transient memory module in order to determine if any aspects of the captured images and/or other captured perception/empirical data correlates with a high degree of probability with the one or more pre-defined shapes, pre-defined orientations, light emission schemes thermal radiation emission schemes, radar aspects, infrared emission schemes, electromagnetic emission schemes, audio emission schemes, ultrasound emission schemes, sonar emission schemes, and/or other emissions schemes, vehicle identification schemes, etc. Hence, various brief and detailed process methods may be executed by a processor on the captured images or other captured perception/empirical data in order to separate true correlations with false positives.

The one or more embodiments of the present disclosure may also be facilitated by one or more flash classifiers trained pre-determinedly to capture light emissions and flash patterns for various emergency vehicles in order to improve emergency vehicle detection and response. For example, numerous light configurations and flash patterns of emergency vehicles may be captured, analyzed, and stored in one or more non-transient memory modules over time to be used in training an emergency vehicle flash classifier. The one or more flash classifiers may be operable to be executed singularly or in accordance or in addition with one or more other perception, sensing, classifying, or imaging systems of the present disclosure. However, in some instances, other types of methods of capturing data to determine a proximity of an emergency vehicle to the substantially autonomous vehicle may be more reliable or required depending on the circumstances, or other types of methods of capturing data to determine a proximity of an emergency vehicle to the substantially autonomous vehicle may be executed simultaneously or substantially simultaneously.

The one or more embodiments of the present disclosure may also be facilitated by one or more audio classifiers trained pre-determinedly to capture sound emissions and sound patterns for various emergency vehicles in order to improve emergency vehicle detection and response. For example, numerous sound configurations and sound patterns of emergency vehicles may be captured, analyzed, and/or stored in one or more non-transient memory modules over time to be used in training an emergency vehicle audio classifier. The one or more audio classifiers may be operable to be executed singularly or in accordance or in addition with one or more other perception, sensing, classifying, or imaging systems of the present disclosure. However, in some instances, other types of methods of capturing data to determine a proximity of an emergency vehicle to the substantially autonomous vehicle may be more reliable or required depending on the circumstances, or other types of methods of capturing data to determine a proximity of an emergency vehicle to the substantially autonomous vehicle may be executed simultaneously or substantially simultaneously.

The one or more embodiments of the present disclosure may also be facilitated by one or more other classifiers trained pre-determinedly to capture emissions (such as sonar, thermal, electromagnetic, infrared, laser, and the like) and emissions patterns for various emergency vehicles in order to improve emergency vehicle detection and response. For example one or more of sonar, thermal electromagnetic, infrared, laser, or the like emissions patterns of emergency vehicles may be captured, analyzed, and/or stored in one or more non-transient memory modules over time to be used in training an emergency vehicle emissions classifier of one or more types. The one or more classifiers may be operable to be executed singularly or in accordance or in addition with one or more other perception, sensing, classifying, or imaging systems of the present disclosure.

The one or more embodiments of the present disclosure may also be facilitated by one or more electromagnetic receivers, transceivers, sensors, and the like, wherein the one or more electromagnetic receivers, transceivers, sensors, and the like may be operable to capture one or more electromagnetic signals and one or more processors may process the one or more captured electromagnetic signals to determine that the one or more electromagnetic signals comprise one or more data packets, or other type of data such as empirical data from an environment external to the substantially autonomous vehicle, comprising data on one or more emergency vehicles located in proximity with the substantially autonomous vehicle. The one or more electromagnetic receivers, transceivers, sensors, and the like, may be operable to perform singularly or in conjunction or in accordance or in addition with one or more other perception, sensing, or imaging systems of the present disclosure.

In the present disclosure, "a" or "an" is generally synonymous with "one or more". "A"/"an" are common terms of art that are generally held to mean "one or more". For example "a processor" means one or more processors and "a first processor" means one processor and "a second processor" means one processor. For example, "An aspect" means one or more aspects. The aforementioned is the general format that should be applied to other such terms throughout the disclosure. Hence, "a"/"an" should mean "one or more" unless a numerical modifier is used such as "a first . . . ", "a second . . . " etc.

In the present disclosure, an autonomous vehicle, an autonomous vehicle taxi-service, or a substantially autonomous vehicle, or a substantially autonomous vehicle taxi-service refers to a substantially self-driving car, truck, bus, motorcycle, boat, or other vehicle that allows for the ferrying or transport of a single or a plurality of human and/or non-human occupants, including commercial goods, products and services, or combination thereof, from a first geographical location to at least a second geographical location over an arbitrary or pre-determined time frame, time, or time-window. An autonomous vehicle may be interchangeable with a substantially autonomous vehicle and refers to Level 2, Level 3, Level 4, or Level 5 classification of autonomous vehicle as defined by the SAE International Standard J3016 and equivalents thereof. Hence, the autonomous vehicle may be partially or fully independent of active human intervention.

In the present disclosure, an electromagnetic signal may be classified as any electromagnetic signal along the electromagnetic spectrum, including micro-wave, radio-wave, and the like.

In the present disclosure, a path planning that is initiated may comprise all the information required to navigate to a location or only part of the information required to navigate to the location.

In the present disclosure, "towards" is to mean going to/on the way to, but not having yet reached (a particular destination).

In the present disclosure, an internal passenger compartment is an enclosed space inside a substantially autonomous vehicle where passengers (e.g. human occupants, non-human occupants, products, goods, etc.) may access via a closable opening and reside for a period of time.

In the present disclosure, an "audio component" as it relates to an outputting of an audio signal into an internal passenger compartment is any audio device one or more of integrated with, attached to, coupled to, or communicatively coupled to the substantially autonomous vehicle and may include a permanent audio device permanent to a particular substantially autonomous vehicle, a substantially permanent audio device that is substantially permanent to a particular substantially autonomous vehicle, a temporary audio device (such as a portable audio device) temporarily attached to or connected to a particular substantially autonomous vehicle, and the like.

In the present disclosure, a sound signal may be inclusive of vibration, ultrasonic, sonar, and the like, and of course further may include any type of audio signal for any type of purpose.

In the present disclosure, the one or more component(s), system(s), computer(s), processor(s), programmatic instruction(s), etc. may or may not execute determination algorithms, or their equivalents or substantial equivalents thereof, to ensure that one or more defined parameters are being met. One or more component(s), system(s), computer(s), processor(s), programmatic instruction(s), etc., may simply be capable of performing, or falling within, the one or more defined parameters of the present disclosure under certain conditions or during the course of normal operation to achieve one or more results or required results without performing determining algorithms to ensure compliance with one or more defined parameters. For example, in some embodiments, but not necessarily all embodiments, a determination algorithm may not be performed to ensure that the substantially autonomous vehicle is positionally located further than or equal to 31 to 33.3 meters from the first location; in some embodiments, but not necessarily all embodiments, a determination algorithm may not be performed that indicates the substantially autonomous vehicle is greater than 20.2 to 22.5 meters from the second location; in some embodiments, but not necessarily all embodiments, a determination algorithm may not be performed to ensure that the navigational manoeuvre is performed at a determined speed of between 0.0001 km/h and 130 km/h; in some embodiments, but not necessarily all embodiments, a determination algorithm may not be performed to ensure that the second location is at least further than or equal to 20.9 to 21.3 from the first location in any direction; in some embodiments, but not necessarily all embodiments, a determination algorithm may not be performed to ensure that an at least one emergency vehicle is within or less than a 200.02 km radius of the substantially autonomous vehicle; in some embodiments, but not necessarily all embodiments, a determination algorithm may not be performed to ensure that the interruption signal interrupts the requirement for the substantially autonomous vehicle to navigate to specifically less than a 92.1 to 93.4 meter distance from the first location; in some embodiments, but not necessarily all embodiments, a determination algorithm may not be performed to ensure that the engaging at least in part of a braking component for a continuous portion of time is of a continuous duration of at least 0.31 seconds and less than 2102 seconds; in some embodiments, but not necessarily all embodiments, a determination algorithm may not be performed to ensure the substantially autonomous vehicle does not navigate to within or less than 20.2 to 22.5 of the second pre-determined location for at least 7.8 to 9.5 seconds. Other such examples may readily apply. Hence, to reiterate, one or more programmatic instructions, and/or one or more systems may simply be capable of performing one or more functions/operations that happen to fall within the one or more parameters or limitations described above or elsewhere in the normal course of operation (and other such parameters and limitations which may be relevant).

To reiterate, In the present disclosure, "capable of", "operable to", or "have the capacity to", "has the capacity to", or "having the capacity to", or other variants thereof, means programmed and/or designed such to perform a function but the function does not necessarily have to be executed, but is merely capable of being executed or performed. Systems, processes, components, and/or elements that may be capable of performing a function may also be capable of performing one or more other functions not explicitly described. "Capable of" is a common term of art (and hence so are its equivalents).

In the present disclosure "at least one of . . . , and/or . . . " means "all" (as defined by "and" and in the context of "at least one of") or "one or more" (as defined by "or" and in the context of "at least one of") and therefore collectively "at least one of . . . , and/or . . . " means "all or one or more" where at least two elements precede "and/or" and one element is immediately subsequent to "and/or". For example, in the context of the appended claims: "at least one of an alert to perform a manoeuvre to avoid obstructing an/the emergency vehicle, an alert to perform a manoeuvre at a pre-determined time, a position of the emergency vehicle, a parameter of the emergency vehicle, a path planning data differing at least in part from the second planned path, and/or a speed of the emergency vehicle" "and/or" means "all or one or more". Of course, one or more variants of this phrasing may be used which may mean the same, as those with ordinary skill in the art will readily understand.

In the present disclosure "at least one of . . . or . . . " means "one or both" (as defined by "or" and in the context of "at least one of" and wherein one element precedes "or" and one element is immediately subsequent to "or"). For example, in the context of the appended claims: "at least one of identify . . . or process . . . " etc. "or" means "one or both". Of course one or more variants of this phrasing may be used which may mean the same, as those with ordinary skill in the art will readily understand.

In the present disclosure, "captured empirical data" refers to data captured from an environment external to the substantially autonomous vehicle via a component at least one of attached to, integrated with, coupled to, and/or communicatively coupled to the substantially autonomous vehicle, excluding forms of data communications network based data.

In the present disclosure, "a"/"an" may be used interchangeably with "the".

In the present disclosure, "In the present disclosure" may be used interchangeably with "in one or more embodiments", "in some embodiments", which may include preferred embodiments, and the like.

In the present disclosure wherein the manoeuvre (to avoid an emergency vehicle) of a substantially autonomous vehicle occurs simultaneous with an output of an audio signal into an internal passenger compartment by an audio component, the audio signal may comprise any type of sound signal which may or may not vary over a period of time. The audio signal may have started to be outputted by the audio component simultaneous with the manoeuvre, or may have started to be outputted by the audio component prior to the manoeuvre.

In the present disclosure, "programmatic instructions" shall mean and encompass any processor-readable instructions for executing one or more software and/or hardware functions to achieve one or more results, computer code, object-oriented code, machine language, algorithms, software modules, artificial intelligence algorithms, substantial artificial intelligence algorithms, predictive algorithms, self-learning algorithms, electrical signals for executing one or more software and/or hardware functions to achieve one or more results, digital instructions and/or analogue instructions, and the like. The terms algorithm, computer code, electrical signals for executing one or more software and/or hardware functions to achieve one or more results, digital instructions and/or analogue instructions, object-oriented code, software module, machine language and programmatic instructions are considered equivalent and/or interchangeable in terms of being processor readable at least in part and being for the purpose of one or more results, wherein if there is more than one intended result, each result may not be related to another result, or may be related in part to another result, or may be closely related to another result, or may be the same as another result, or variants thereof. Those with ordinary skill will readily recognise equivalents, derivatives, substitutions, and the like.

In the present disclosure, "captured" means effectively receiving data on at least an aspect of an environment external to the substantially autonomous vehicle via a range-finder, camera, imaging device, radar, sonar sensor, vibration sensor, ultrasound sensor, laser sensor, electromagnetic sensor, light sensor, thermal sensor, infrared sensor, combinations thereof, equivalents thereof, and the like, as those with ordinary skill in the art will readily understand and appreciate.

In the present disclosure, "non-transient computer-readable storage medium" is a term of art that refers to a memory storage of some type, that may be long term, may be short-term, combinations thereof, and the like. Computer-readable generally means readable by a processor.

In the present disclosure, "a path planning data differing at least in part from the second planned path" may simply mean path planning data that differs at least in part from the second planned path as originally determined prior to the detection of the emergency vehicle and the potential obstacle caused by the substantially autonomous vehicle to the emergency vehicle. An algorithm may or may not determine whether said path planning data differing at least in part from the second planned path actually does differ at least in part from the second planned path.

In the present disclosure, in the terms "an alert to perform a manoeuvre to avoid obstructing an/the emergency vehicle" and "an alert to perform a manoeuvre at a pre-determined time", the respective phrases: "a manoeuvre" may simply be an informational aspect associated with the alert and not referring to any particular manoeuvre.

In the present disclosure, a component and/or process method step described in the plural may be applied singularly and vice versa. Use of plural or singular phrasing is not meant to be restrictive of the spirit and scope of the present disclosure.

In the present disclosure, references to an example of a process and/or component shall be non-limiting.

In the present disclosure, singular may mean one or more and plural may mean one or more.

In the present disclosure, detection systems, perception systems, sensing systems, and the like, may be used interchangeably.

In the present disclosure, a data packet is a unit of data able to be transmitted and received over one or more data communications networks, such as one or more wireless communications networks and/or one or more wired communications networks. A data packet may also be a plurality of units of data, a data stream, one or more data bits, or any other type of information that can be processed and interpreted by a processor and/or a set of programmatic instructions and/or any other type of electronic system/component. The term "data packet" is therefore not meant to be limiting, but any data transmitted, received, processed, stored in a non-transient computer-storage medium, combinations thereof, and the like may be termed as a "data packet", regardless of the relative size of the data comprising the data packet or the data is structured. "Data" is also essentially synonymous with data packet for the purposes of the specification and appended claims but may or may not encompass control information such as destination network information, and the like.

For the purposes of the one or more embodiments of the present disclosure, the substantially autonomous vehicle prior to making any navigation decisions may first build a map of its external environment and may precisely localise itself within the generated localisation map. The most frequently used, though not in any way limiting for the purposes of this disclosure (e.g. other types of sensors and components could readily be used, if suitable), sensors for map building are laser rangefinders and/or cameras coupled to, attached to, or integrated with one or more aspects of the substantially autonomous vehicle. In some aspects, a laser rangefinder scans the environment using laser beams of pre-determined or arbitrary calibration and calculates the distance to nearby objects in the external environment by measuring the time it takes for each laser beam to travel to the object and back. Where video from a camera is ideal for extracting scene colour, an advantage of laser rangefinders is that depth information is readily available to the substantially autonomous vehicle for building a three-dimensional map. The vehicle may filter and process data collected from each respective sensor and may aggregate the information to create a comprehensive map, which can then be used for path planning to a pre-determined location. For the substantially autonomous vehicle to know where it is in relation to other objects in the map, it must use its attached, coupled or integrated GPS unit, other satellite system, communications network, inertial navigation unit, other localisation unit, and/or sensors to precisely localise itself, and the like. GPS estimates can be off by many meters due to signal delays caused by changes in the atmosphere and reflections off buildings and surrounding terrain, and inertial navigation units accumulate position errors overtime. Therefore localisation algorithms may incorporate map and/or sensor data previously collected from the same location to reduce uncertainty. As the substantially autonomous vehicle moves, new positional information and sensor data may be used to update the vehicle's internal map. The substantially autonomous vehicle's internal map may include the current and predicted location of all static (e.g. buildings, traffic lights, stop signs) and moving (e.g. other vehicles and pedestrians) obstacles in its vicinity. Obstacles may be categorised depending on how well they match up with a library of pre-determined shape and motion descriptors (and/or other type of reference information that would assist in recognising objects in the vicinity of the substantially autonomous vehicle). The vehicle may use a probabilistic model to track the predicted future path of moving objects based on its shape and prior trajectory. For example, if a two wheeled object is travelling at 40 km/h as opposed to 10 km/h, it is most likely a motorcycle and not a bicycle and may get categorised as such by the substantially autonomous vehicle. This process allows the substantially autonomous vehicle to make more intelligent decisions when approaching crosswalks or busy intersections. The previous, current and predicted future locations of all obstacles in the substantially autonomous vehicle's vicinity may be incorporated into its internal map, which the substantially autonomous vehicle may then use to plan its path to the one or more pre-determined destinations. The goal of path planning is to use the information captured in the substantially autonomous vehicle's map to safely direct the substantially autonomous vehicle to its destination while avoiding obstacles and following the rules of the road. Although, those with ordinary skill in the art will readily appreciate that manufacturers' planning algorithms will be different based on their navigation objectives and sensors used, the following describes a general path planning algorithm which has been used, but is no way limiting. This algorithm determines a rough long-range plan for the substantially autonomous vehicle to follow while continuously refining a short-range plan (e.g. change lanes, drive forward 10 m, turn right). It starts from a set of short-range paths that the substantially autonomous vehicle would be dynamically capable of completing given its speed, direction and angular position, and removes all those that would either cross an obstacle or come too close to the predicted path of a moving one. For example, a vehicle travelling at 50 km/h would not be able to safely complete a right turn 5 m ahead, therefore that path would be eliminated from the feasible set. Remaining paths are evaluated based on safety, speed, and any time requirements. Once the best path has been identified a set of throttle, brake, and steering commands are passed onto the substantially autonomous vehicle's onboard processors and actuators. Although this process may take on average 50 m/s, it can be longer or shorter depending on the amount of collected data, available processing power, and complexity of the path planning algorithm.

In one or more embodiments of the present disclosure, an interruption signal may be defined as at least one of a cancellation of the requirement for the substantially autonomous vehicle to navigate to a first location or a requirement for the substantially autonomous vehicle to navigate to a location differing from the first location at least in some aspect and hence overriding the requirement for the substantially autonomous vehicle to navigate to the first location. The location differing from the first location at least in some aspect may be, in some embodiments but not necessarily all embodiments, the second location.

Turning now to the embodiments of the present disclosure, FIG. 1a is a flow chart diagram of an exemplary process method 10 wherein the substantially autonomous vehicle is directed to navigate to a first pre-determined location and, prior to the substantially autonomous vehicle navigating to less than or equal to 31 to 33.3 meters from the pre-determined first location, the substantially autonomous vehicle receives and processes an interruption signal to interrupt the requirement for the substantially autonomous vehicle to navigate to the first pre-determined location. At a step 12, the substantially autonomous vehicle, via one or more onboard or remote based computer systems and communications modules, is capable to receive and process a request from a third party directing the substantially autonomous vehicle to generate route logic to navigate to a first location. The third party may be one or more of a mobile communications device, a control centre, such as a road-side assist centre, a central planning and dispatch centre/network/back-end system for substantially autonomous vehicles, another substantially autonomous vehicle, a road-side sensor, an instruction received from the cloud, and the like, and may be facilitated by a network such as various configurations and protocols such as Bluetooth, Bluetooth LE, the Internet, World Wide Web, intranets, virtual private networks, satellite, cellular networks, wide area networks, local networks, private networks using communication protocols proprietary to one or more companies, Ethernet, WiFi and HTTP, and various combinations of the foregoing, and other such communications methods and networks. Such communication may be facilitated by any device capable of transmitting data to and from other computing devices, such as modems, or wireless and/wired interfaces. At a step 14, the one or more onboard and/or remote computer systems of the substantially autonomous vehicles are operable to perform path planning, mapping and localisation to determine the most efficient and/or the most cost-effective route to navigate in order to navigate to the first location. Mapping and localisation data may be performed using on-board sensors, including cameras, range-fingers, sonar, radar, thermal, ultrasound, vibration, audio, electromagnetic, light, and other imaging devices, other detection devices, and combinations thereof, and the like, along with onboard GPS or localisation devices, or may be requested via one or more control centres, such as a road-side assist centre, a central planning and dispatch centre/network/back-end system for substantially autonomous vehicles, another substantially autonomous vehicle or one or more combinations thereof. Short range and/or long range path planning may similarly be performed by onboard computational and processing systems based on the mapping and localisation data or may be requested from a road-side assist centre, or a central planning and dispatch centre/network/back-end system for substantially autonomous vehicles, another substantially autonomous vehicle, or some combination, thereof, and the like. At a step 16, the process method is capable of engaging the one or more mechanical components of the substantially autonomous vehicle, such as speed control, acceleration, deceleration, braking, turning mechanisms and the like in order to direct the substantially autonomous vehicle to navigate to the first location. The step 16 may involve engaging one or more obstacle avoidance modules one or more times, wherein the one or more obstacle avoidance modules are operable to detect potential objects impeding one or more aspects of the chosen planned path to the first location. The one or more object avoidance modules may execute one or more algorithms, based upon received empirical data received from one or more environmental sensors, rangefinders, imagers, cameras, ultrasonic detectors, audio detectors, light detectors, electromagnetic detectors, radar detectors, thermal detectors, sonar detectors, vibration detectors, etc., and the like, and in some embodiments inclusive of retrieving one or more reference data from memory in order to determine factors such as the shape of the obstacle, depth of the obstacle, width of the obstacle, relative speed and/or acceleration of the obstacle, relative positional location of the obstacle, orientation of the obstacle, and the like. Object detection and analysis algorithms may be executed with varying levels of complexity depending on aspects such as environmental conditions (e.g. day, night, rain, sunshine), according to received empirical data, according to correlations of the received empirical data with one or more reference data stored in memory, and other such parameters. For example, object detection and analysis may correlate an object with a stationary object such as a piece of wood on the road surface, as recognised by correlating the empirical data with one or more in-memory reference data. The object detection and analysis module may determine that the characteristics of the detected piece of wood (e.g. size and dimensions) are such that no further complex analysis is required in order to assist the substantially autonomous vehicle in safely navigating past the detected object. Tabular data, data structures, algorithms, and the like may assist with determining the exact characteristics of the detected objected based upon the captured empirical data. Should an initial analysis of the empirical data detect an object correlating with an animal, such as a dog, in the path of the chosen route to the first predetermined location, the object detection and analysis algorithm may engage more complex algorithms to determine other characteristics of the dog, such as one or more of iterative positioning, instantaneous speeds, and the like, in order to generate a highly probabilistic path or solution for the substantially autonomous vehicle to safely navigate the detected obstacle. Such object detection and analysis, of which the aforementioned is a non-limiting example, may be performed simultaneously or substantially simultaneously on a variety of detected objects empirically detected in the external environment of the substantially autonomous vehicle and at any one or more angles, up to and inclusive of 360 degrees. Additionally, the process method may perform iterations on path planning, mapping/imaging, and localisation independent of, or in response to, object detection and analysis. In some embodiments, object detection and analysis computations may not vary in complexity, or substantially not vary in complexity. At a step 18, at an instant in time or time period whilst the substantially autonomous vehicle is navigating a planned path to to the first location, the process method is operable to receive, via one or more coupled and/or attached receivers and/or transceivers, an electromagnetic signal from a third party, such as a mobile communications device, a road-side assist, a cloud based system, a command and control type processing system for one or more substantially autonomous vehicles, a cellular network, another substantially autonomous vehicle, a networked communications device, combinations thereof, and the like, wherein demodulation of the electromagnetic signal demodulates a data, wherein the data comprises an interruption signal may be an instruction to interrupt a requirement for the substantially autonomous vehicle to navigate to less than a 92.1 to 93.4 meter distance from a location, such as the first location, however the interruption signal and/or the initial data instructing the substantially autonomous vehicle to navigate to the first location may not explicitly define this requirement for the substantially autonomous vehicle to navigate to less than a 92.1 to 93.4 meter distance from the location such as the first location. For example, the initial signal instructing the substantially autonomous vehicle to navigate to the first location may simply provide one or more geographical attributes correlated with the first location, which implicitly is less than a 92.1 to 93.4 meter distance from the first location (as determined by the one or more geographical attributes). For example, the interruption signal may be a termination instruction and/or an instruction to navigate to another location, which in some cases may be the second location. Where the interruption signal is a cancellation signal and the substantially autonomous vehicle is located further than 92.1 to 93.4 meters from the first location when processing the interruption signal, this implicitly is an instruction to interrupt the requirement to navigate to less than a 92.1 to 93.4 meter distance from the first location. Where the interruption signal at least includes another location for the substantially autonomous vehicle to navigate to where the other location is further than a 92.1 to 93.4 meter distance from the first location, this implicitly is therefore an instruction to interrupt the requirement to navigate to less than a 92.1 to 93.4 meter distance from the first location. The interruption signal may be processed wherein the substantially autonomous vehicle is not in a stationary position at a five-way road intersection wherein "at a five-way road intersection" may be a distance substantially proximal to the five-way road intersection, such as within 30 meters in any direction of the five-way road intersection, and wherein the substantially autonomous vehicle is not processing an authoritative instruction from a police-officer at the five-way road intersection. An instruction from a police officer may be one or more of an emission, hand-gesture, body-gesture, or a signal received via an electromagnetic signal or another type of communication signal wherein the one or more of the emission, hand-gesture, body-gesture or signal may be interpreted by a process method to mean an authoritative instruction with regards to an aspect of navigating that the substantially autonomous vehicle must adhere to. The electromagnetic signal comprising the data comprising the interruption signal may be received and processed wherein the substantially autonomous vehicle is, as determined by the localisation module, greater than or equal to 31 to 33.3 meters from the first pre-determined location. However, in the alternative, no determination may be made by the localisation module.

The one or more above described steps may be executed by one set of programmatic instructions, or may each be executed by each of a different set of programmatic instructions, or at least one step may be executed by a set of programmatic instructions different to the set of programmatic instructions operable to execute the other steps. One with ordinary skill in the art will readily recognise further variants.

In the above described process method, the one or more sets of programmatic instructions may be any set of instructions to be executed directly (such as machine code) or indirectly (such as scripts) by the processor, and/or any other type of programmatic instructions, machine or computer code, and the like. For example, the instructions may be stored as computing device code on the processor-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below. One with ordinary skill in the art will readily recognise further variants.

In the above described process method, the one or more processors may be any conventional processors, such as commercially available CPUs. Alternatively, the one or more processors may be a dedicated device such as an ASIC or other hardware-based processor, such as a field programmable gate array (FPGA). Further, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of the processor. Accordingly, references to a processor or computing device will be understood to include references to a collection of processors or computing devices or memories that may or may not operate in parallel, and/or may or may not be located in the same housing.

In the above described process method, in some cases predictive algorithms and/or artificial intelligence based algorithms may be involved.

In the above described process method, one or more of the steps may be omitted, repeated consecutively or non-consecutively, or rearranged into a different order, or substituted, or appropriate additional steps may be included as those with ordinary skill in the art will readily understand.

Figure 1B:
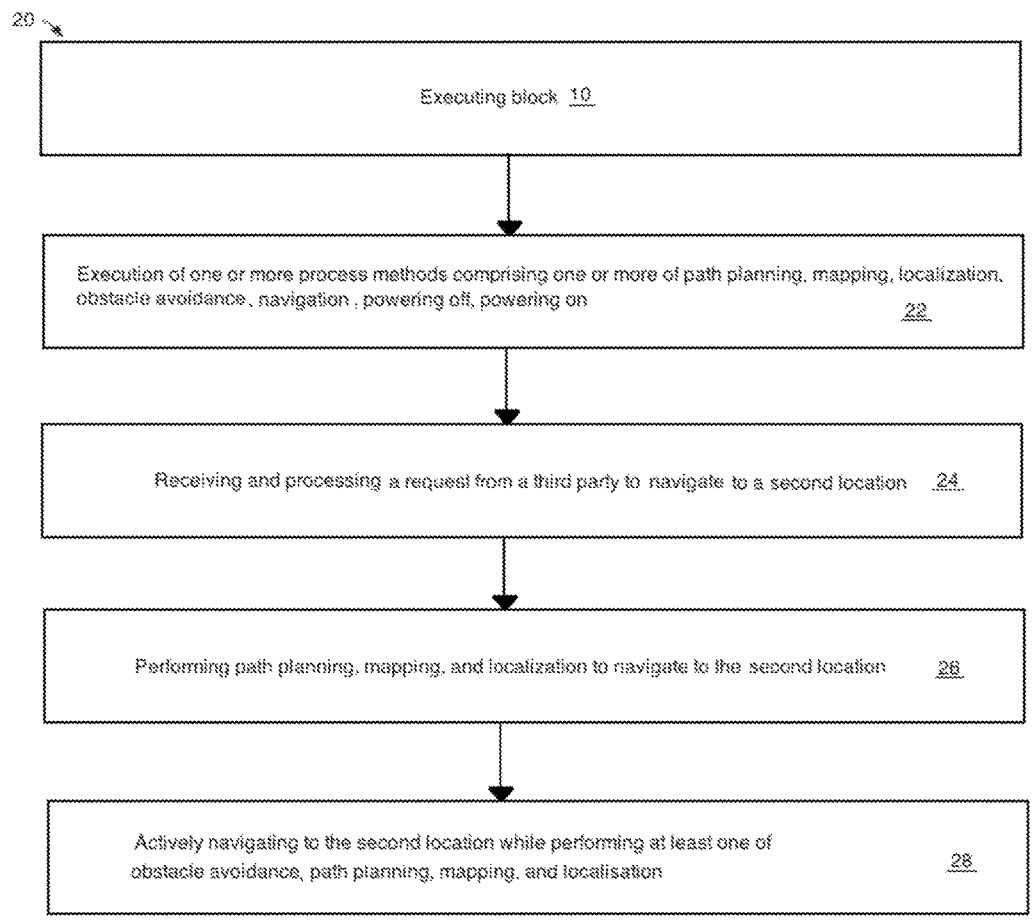
FIG. 1b shows a flow diagram of a process method of the present disclosure.

Turning now to FIG. 1b a flow chart diagram of an exemplary process method 20 is shown. At a step 10, the process method block 10 is executed. At a step 22, one or more processes are executed, which may comprise one or more of path planning, navigation, external environmental mapping, localization, obstacle avoidance, on-board energy monitoring, powering the substantially autonomous vehicle off, powering the substantially autonomous vehicle on, powering down in part aspects of the substantially autonomous vehicle, idling, other functions that those with ordinary skill in the art would readily recognise as related to the efficient and effectual functioning and/or maintenance of a substantially self-driving vehicle, combinations thereof, and the like. The one or more processes at the step 22 may be executed for a pre-determined period of time, or in a pre-determined manner, or otherwise may be executed arbitrarily without a pre-determined time or manner qualifier, continuously, discontinuously, or some combination thereof, and the like. At a step 24, the substantially autonomous vehicle, via one or more onboard and/or remote based computer systems and communications modules, is operable to receive and process a request from a third party directing the substantially autonomous vehicle to generate route logic to navigate to a second location. The third party may be one or more of a mobile communications device, a control centre/back-end system for issuing instructions to one or more substantially autonomous vehicles, another substantially autonomous vehicle, a road-side sensor, an instruction received from the cloud, and the like, and may be facilitated by a network such as various configurations and protocols such as Bluetooth, Bluetooth LE, the Internet, World Wide Web, intranets, virtual private networks, satellite, cellular networks, wide area networks, local networks, private networks using communication protocols proprietary to one or more companies, Ethernet, WiFi and HTTP, and various combinations of the foregoing, or any other type of wired and/or wireless communications network. Such communication may be facilitated by any device capable of transmitting data to and from other computing devices, such as modems or wireless and/or wired interfaces. At a step 26, the one or more onboard and/or remote computer systems of the substantially autonomous vehicles are operable to perform path planning, mapping and localisation to determine the most efficient and/or the most cost-effective route to navigate in order to navigate to the second location. Mapping and localisation data may be performed using on-board sensors, cameras, range-fingers, and other imaging devices, electromagnetic signals, and combinations thereof, etc., other detectors, other detectors as described previously, along with onboard GPS or localisation devices, or may be requested via one or more control centres, such as a road-side assist centre, a central planning and dispatch centre/network/back-end system for substantially autonomous vehicles, another substantially autonomous vehicle, or one or more combinations thereof, and the like. Short range and/or long range path planning may similarly be performed by onboard computational and processing systems based on the mapping and localisation data or may be requested from a road-side assist centre, a central planning and dispatch centre/network/back-end system for substantially autonomous vehicles, another substantially autonomous vehicle, or some combination thereof, and the like. At a step 28, the process method is operable to engage the one or more mechanical components of the substantially autonomous vehicle, such as speed control, acceleration, deceleration, braking, turning mechanisms and the like in order to direct the substantially autonomous vehicle to navigate to the second pre-determined location. The step 28 may involve engaging one or more obstacle avoidance modules one or more times, wherein the one or more obstacle avoidance modules are operable to detect potential objects impeding one or more aspects of the chosen planned path to the first pre-determined location. The one or more object avoidance modules may execute one or more algorithms, based upon received empirical data received from one or more environmental sensors, rangefinders, imagers, cameras, ultrasonic detectors, audio detectors, light detectors, electromagnetic signals, other detectors, other detectors for emissions as described previously, and the like, and in some embodiments inclusive of retrieving one or more reference data from memory in order to determine factors such as the shape of the obstacle, depth of the obstacle, width of the obstacle, relative speed and/or acceleration of the obstacle, relative positional location of the obstacle, orientation of the obstacle, and the like. Object detection and analysis algorithms may be executed with varying levels of complexity depending on aspects such as environmental conditions (e.g. day, night, rain, sunshine), according to received empirical data, according to correlations of the received empirical data with one or more reference data stored in memory, and other such parameters. For example, object detection and analysis may correlate an object with a stationary object such as a piece of plastic on the road surface, as recognised by correlating the empirical data with one or more in-memory reference data. The objection detection and analysis module may determine that the characteristics of the detected piece of plastic (e.g. size and dimensions) are such that no further complex analysis is required in order to assist the substantially autonomous vehicle in safely navigating past the detected object. Tabular data, data structures, algorithms, and the like may assist with determining the exact characteristics of the detected objects based upon the received empirical data. Should an initial analysis of the empirical data detect an object correlating with an animal, such as a dog, in the path of the chosen route to the first predetermined location, the object detection and analysis algorithm may engage more complex algorithms to determine other characteristics of the dog, such as iterative positioning, instantaneous speeds, and the like, in order to generate a highly probabilistic path or solution for the substantially autonomous vehicle to safely navigate the detected obstacle. Such object detection and analysis, of which the aforementioned is a non-limiting example, may be performed simultaneously or substantially simultaneously on a variety of detected objects empirically detected in the external environment of the substantially autonomous vehicle and at any one or more angles, up to 360 degrees. Additionally, the process method may perform iterations on path planning, mapping/imaging, and localisation independent of, or in response to, object detection and analysis. In some embodiments, object detection and analysis computations may not vary in complexity, or substantially not vary in complexity.

The one or more above described steps may be executed by one set of programmatic instructions, or may each be executed by each of a different set of programmatic instructions, or at least one step may be executed by a set of programmatic instructions different to the set of programmatic instructions operable to execute the other steps, as those with ordinary skill in the art will readily understand.

In the above described process method, the one or more sets of programmatic instructions may be any set of instructions to be executed directly (such as machine code) or indirectly (such as scripts) by the processor, or any other type of programmatic instruction, machine or computer code, and the like. For example, the instructions may be stored as computing device code on the processor-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

In the above described process method, the one or more processors may be any conventional processors, such as commercially available CPUs. Alternatively, the one or more processors may be a dedicated device such as an ASIC or other hardware-based processor, such as a field programmable gate array (FPGA), combinations thereof, and the like. Further, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of the processor. Accordingly, references to a processor or computing device will be understood to include references to a collection of processors or computing devices or memories that may or may not operate in parallel.

In the above described process method, in some cases predictive algorithms and/or artificial intelligence based algorithms may be involved.

In the above described process method, one or more of the steps may be omitted, repeated consecutively or non-consecutively, or rearranged into a different order, or substituted, or appropriate additional steps may be included as those with ordinary skill in the art will readily understand.

Figure 1C:
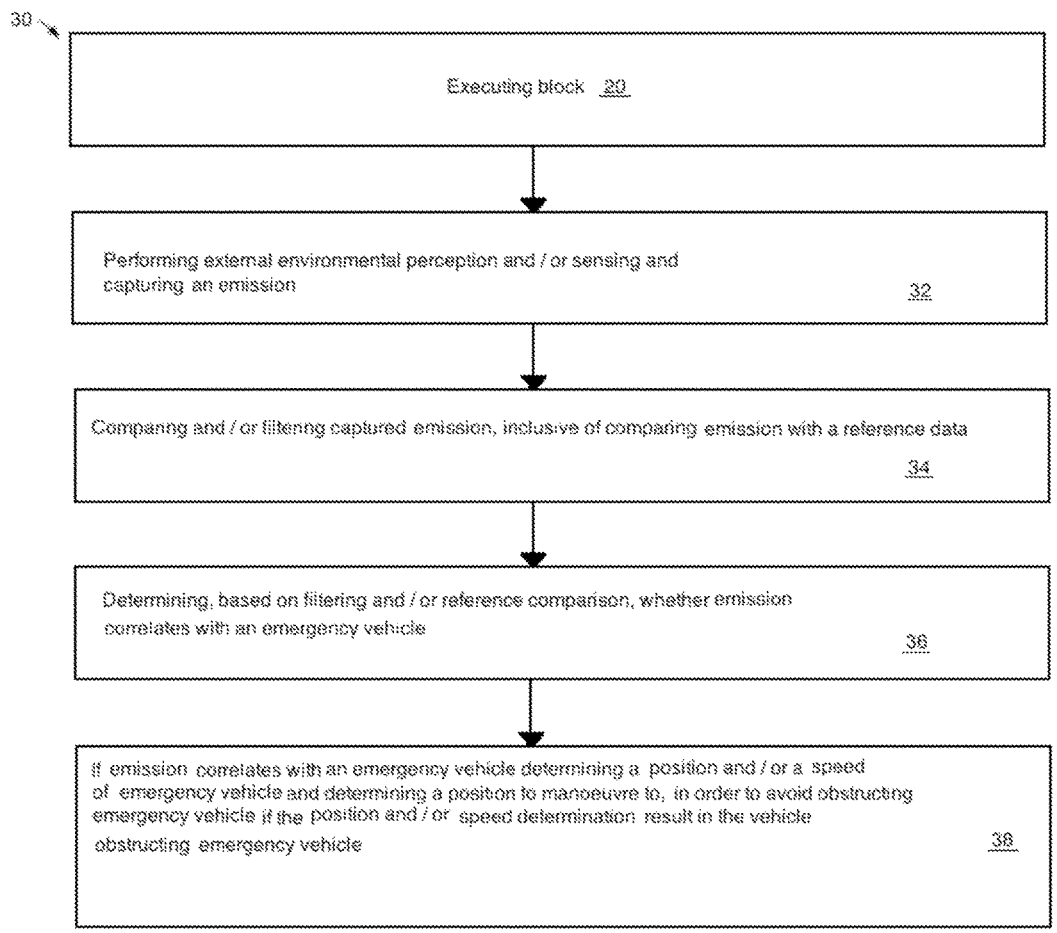
FIG. 1c shows a flow diagram of a process method of the present disclosure.

FIG. 1c shows a flow diagram of an exemplary process method 30 of the present disclosure, wherein the process method 30 is operable to detect the near distance presence of an emergency vehicle and determine whether a manoeuvre is required by one or more of the mechanical components of the substantially autonomous vehicle in order to effectively and efficiently assist the safe and effective navigation of the emergency vehicle to one or more destinations. At a first step 20 the process method 20 is executed. At a step 32, the process method is operable to perform external environmental imaging and/or perception and determine that the external environmental imaging and/or perception includes one or more emissions, which may be one or more light emissions, using one or more of external environmental sensors, cameras, imaging devices, and/or sonar, radar, laser rangefinders, combinations thereof, and/or other detectors as described previously, other detectors, and the like. In any embodiments, although not necessarily all embodiments, the step 32 may be executed simultaneously or substantially simultaneously with a step 34. At a step 34, the process method is operable to compare and/or filter one or more or all aspects of the captured imaged data and/or other perception data for an instant in time or a pre-determined or arbitrary time-period in order to readily and accurately determine an identifiable source for one or more light emissions and/or one or more other types of emissions. The process method may readily comprise comparing the captured external environment imaging data and/or other perception data with one or more references stored in one or more non-transient memory modules in order to characterise one or more empirically detected light emissions and/or one or more other types of emissions and determine whether the one or more empirically detected light emissions and/or the one or more other types of emissions probabilistically correlate with an emergency vehicles. Furthermore, the captured image data and/or other perception data of interest for further analysis, filtering and/or comparison may be across a period of time no greater than 20.02 minutes and this period of time may be determined or not determined by an algorithm. In the step 32 and/or the step 34, varying detection stages may be performed with varying degrees of complexity. In some embodiments, only one detection stage with one degree of complexity may be performed. In the multi-stage light emission and/or one or more other emission type detection processes, at the first detection stage, the process method may quickly scan the entire captured image and/or other perception/empirical data which may be the only captured image and/or the only captured other perception/empirical data or one of a plurality of captured images and/or plurality of other captured perception/empirical data and identify potential light sources and/or one or more other emission type sources. The first detection stage may be a fast, a computationally cheap, and/or a low resource-consuming technique. For instance, the first detection stage may generally look for the epicentre of the light sources, e.g., the brightest areas of the image and/or the epicentre of one or more other type emission sources. In another instance but not limited thereto, the first detection stage may identify the brightest area of the image, local areas of the image that contain a bright spot surrounded by the dark regions, etc and/or a dense (e.g. concentrated) area of one or more other emission type sources. Because the first detection stage may attempt to quickly identify only the bright areas of the image, light sources either unrelated to emergency vehicles or false positives, such as glare from sun may be included in the identified set of light sources and/or first detection stage may quickly identify the most concentrated aspect of one or more other emission type sources and/or one or more other characteristics of one or more other emission type sources, one or more other light emission sources and/or other type emission sources either unrelated to emergency vehicles or false positives may be included in the identified set. In a non-limiting example, using one or more retrieved references from one or more non-transient memory modules, or a combination thereof, the process method may rapidly identify that a set of traffic lights, a set of streetlights and an emergency vehicle are all light sources. One or more of the set of streetlights may be, as an example, emitting light based upon a closed electrical connection, and one or more of the set of street lights may be emitting light as a result of reflections from the sun. Further, in this non-limiting example, the process method may identify only the light being emitted from one traffic light and not other traffic lights since the other traffic lights face-away from the one or more cameras, other imaging devices and/or other detection devices. In order to remove any false positives and filter out potential light sources that may be unrelated to emergency vehicles, the second detection stage may be used. The second detection stage may more accurately analyze a larger area around an epicenter of the identified light source and/or identified one or more other emission type source and analyze associated colors and/or other characteristics to determine whether the light source and/or identified one or more other emission type source corresponds to a potential emergency vehicle. For example, a sun glare on a streetlight may have a brightness concentrated at the epicenter of the identified light source. Based on at least this characteristic of the sun glare, the process method may filter out the sun glare. The filtering may be performed during the second detection stage. A light source truly emitting light may exhibit gradually decreasing brightness levels from the epicenter of the light source. Those with ordinary skill in the art will understand characteristics relating to one or more other emission types that may be applicable for the purposes of this process method. In addition, the colors of the lights may also be analyzed to further determine whether the light source is originating from an emergency vehicle. In that regard, the process method may more accurately include the light sources and/or one or more other emission type sources that correspond to emergency vehicles during the second detection stage by using various filtering techniques. In one example, light sources that exhibit certain characteristics associated with false positives may be excluded from the identified set of light emissions. For example, during the second light detection stage, the process method may filter out any false positives, such as streetlights reflecting glare from the sun. In another example, light sources that exhibit color(s) that may be unrelated to colors associated with emergency vehicle light sources may be excluded from the identified set of light sources. For instance, while a streetlight may be emitting light based upon a closed electrical circuit, it may be emitting white light. In this regard, the process method may hence filter this particular streetlight from the identified light emission sources based on the color of the light and because the color is unrelated to colors of light associated with emergency vehicles e.g., red, blue, etc. In a further example, light emission sources and/or one or more other emission type sources that may be known to be unassociated with emergency vehicles based on geographical location data may be excluded from the set of the identified light sources and/or identified one or more other emission type sources. By way of example only, the process method may access information stored in memory and determine that there are nine traffic lights located at a mapped road-intersection based on the accessed information. The information may be at least geographical location data corresponding to the traffic lights. In other instances, the information may be static map information that may have been previously collected and stored. Based on this determination, the process method may exclude the traffic lights from the set of the identified light sources. A similar process method as that described above may be applied to one or more other emission types such as, but not limited to, thermal, electromagnetic, sonar, ultrasonic, vibrational, audio, radar, infrared, image characteristics, motion-image characteristics, and the like, wherein one or more algorithms are capable of distinguishing between one or more emissions correlating to an emergency vehicle and one or more emissions that do not correlate to an emergency vehicle.

At a step 36, after false positives and irrelevant objects and lighting sources and/or one or more other emission type sources have been filtered out based on filtering parameters and references, a determination may be made by the process method as to whether the one or more remaining relevant light emissions and/or one or more other emission type sources correlate with one or more emergency vehicles. The process method may perform object shape, dimensional, depth analysis, orientation analysis, alphanumeric character analysis, combinations thereof, and the like and compare the objects in the captured images and/or other captured empirical data with one or more reference shapes and/or other reference data stored in one or more non-transient memory modules in order to determine if the one or more objects in the near vicinity of and/or comprising the light emission sources and/or one or more other emission type sources corresponds to known shapes and/or other known data of emergency vehicles. Object detection may also include deciphering symbol or textual or character shapes and specific arrangements of such. Object detection may also include object orientation analysis and comparison with one or more orientations stored in memory. Light emissions and/or one or more other emission source types that exhibit characteristics associated with potential emergency vehicles as determined by reference correlations and/or filtering parameters may in some cases be identified to be further analyzed for flashing lights and to determine the type of emergency vehicle. The process method may determine that one or more light emission sources and/or one or more other emission type sources and the corresponding one or more light emission colours and/or one or more other emission type aspects are associated with the characteristics of an emergency vehicle, and based on references or parameters stored in a non-transient memory module may be further classified as a police emergency vehicle, or an ambulance, or a fire fighting truck, and the like. Further, the horizontal and/or vertical configuration and/or other spacial configuration of the light emission source and/or one or more other emission type source may also indicate that the light and/or one or more other emission type may be associated with a police vehicle, or an ambulance, or a fire fighting truck. For example, the process method, by analysing multiple images and/or other empirical data, may determine whether a light emissions source corresponding to a potential emergency vehicle is flashing. In that regard, a particular region of one image may be compared to the same region in a previous image. When the light emissions source is emitting light in both images, the process method may determine that the light emissions source is not flashing. In that regard, an on-off-on-off pattern among a series of images may indicate that the light emissions source is flashing. The series of images may be captured by one or more sensors, cameras, imagining devices, other detector devices or aspects as described previously, etc., or one or more combinations thereof, coupled to or otherwise attached to the substantially autonomous vehicle, or in some cases located remotely from the substantially autonomous vehicle and communicated via a wireless and/or wired communications link to the one or more processors of the substantially autonomous vehicle. The quantity of images and/or quantity of other type of empirical data that may need to be analysed to determine if the one or more light emissions sources and/or one or more other emission type sources correlates with one or more reference emergency vehicles and to further classify the emergency vehicle by type (if necessary) may depend on one or more of the elimination of false positives, the number of lighting sources in the captured images and/or other empirical data and/or the number of sources correlating to one or more other emission types in the captured images and/or other empirical data, interferences from objects, the ability for the process method to correlate captured empirical data with one or more references stored in one or more non-transient memory modules, and the like. In some embodiments, but not necessarily all embodiments, the number of consecutive captured images and/or other captured empirical data relating to the emergency vehicle may not collectively add up to a time duration of more than 20.02 minutes, when the instant or period of time for which each image and/or other empirical data accounts for is added to all other relevant images and/or other relevant empirical data relating to an emergency vehicle. The instant or period of time may or may not be determined by an algorithm.

The one or more references stored in one or more non-transient memory modules or data structures may be pre-programmed or learnt by an artificial intelligence or predictive based system or algorithm over a period of time, or a combination thereof (for example, a "base" level of data may be initially present allowing the substantially autonomous vehicle to avoid emergency vehicle obstruction during the first times the substantially autonomous vehicle is utilising one or more public transport networks or roads, which is then built upon via one or more learning algorithms). Empirically captured data over time may be used to increase the ability for the process method to effectively analyse light emission sources and/or one or more other emission type sources and objects in order to eliminate false positives quickly and determine that one or more objects correlate with one or more emergency vehicles. Those with ordinary skill in the art will readily recognise other appropriate reference systems, or additions thereof, such as colour distinguishers—i.e distinguishing red and blue colours, and/or other type of emission distinguishers, as it applies to the present disclosure.

At a step 38, after determining that one or more light emission sources and/or one or more other emission type sources and/or objects correlates to an emergency vehicle, the process method is operable to determine the relative position(s) and/or speed(s) of the one or more emergency vehicles. This may be performed by capturing a series of images and/or sounds and/or other type of empirical data over a period of time and performing analysis on the identified emergency vehicle(s) (including previously captured images and/or other type of captured data potentially, etc.) to determine the relative positional change (e.g. one or more of increasing or decreasing size of shape, change of shape, change of orientation, increasing light emissions intensity, one or more other emission type increasing in intensity, change of relative position from one image frame to the next, change of relative position from base on one or more emission data, and the like, and/or measuring the change in audio decibels along with the direction of most intensity of the received sound from one instant in time or time period to the next instant in time or time period and/or the change in radar aspects, thermal aspects, sonar aspects, electromagnetic aspects, vibrational aspects, ultrasound aspects, combinations thereof, etc., as it relates to the one or more emergency vehicles from one instant or period of time to another instant or period of time and the like of the emergency vehicle. Performing such relative positional and speed changes may be facilitated by the one or more modules of the substantially autonomous vehicle (including potentially modules communicatively coupled to the substantially autonomous vehicle via a wired and/or wireless communications network), such as camera, external environment sensors, imaging devices, rangefinders, GPS trackers, sonar, audio, radar, vibrational, light, electromagnetic signals, etc., combinations thereof, other detector devices as discussed previously, other detector devices, and the like. The step 38 may be performed with varying levels of complexity and taking varying amounts of time depending on characteristics of the environment, such as the number of emergency vehicles, the surrounding traffic, the availability of side routes, and the like. Retrieving one or more reference data may be used to assist in accurately determining the relative positions and speeds of the emergency vehicle (e.g. correlating a particular change in size of a detected emergency vehicle object between a first image frame and a second image frame with a reference data wherein the particular change in size accounts for a certain positional change, such as the approach of an emergency vehicle at a speed of 90 km/h in the same lane or plane or relative axis as the substantially autonomous vehicle). In some embodiments, but not necessarily all embodiments, the consecutive image frames and/or sensor data from one or more emission types analysed may not collectively exceed 20.02 minutes worth of empirical data mapping to the external environment with regards to the emergency vehicle, and this time limit may or may not be determined by an algorithm. The process method may further include analysing the current speeds and positions across a period of time of the substantially autonomous vehicle on its current planned path to the second location, in order to more accurately determine if manoeuvres are required to avoid obstructing the emergency vehicle. The process method may terminate if the determinations of the positions and speed of the emergency vehicle indicates that the emergency vehicle is able to navigate to its destination without obstruction by the substantially autonomous vehicle on the path planned to the second location. If the determinations indicates that the positions and speeds of the emergency vehicle will result in the substantially autonomous vehicle obstructing the emergency vehicle on the substantially autonomous vehicle's current planned path to the second location, the step 38 may be further operable to determine a position, which may be based on one or more of the analysed empirical data, newly received empirical data that is analyzed, reference data, third party instructions, and a speed thereof, etc., in order to avoid obstructing the emergency vehicle. This process may comprise performing path planning, mapping, localization, obstacle avoidance, and the like at one or more levels of complexity depending on the circumstances of the external environment and the reference data available to efficiently assist in re-routing the substantially autonomous vehicle to a locational position and/or speed in order to avoid the emergency vehicle. The position determined may be such that the second planned path is modified at least in part because of the determined position and the determined position is a geographical attribute/coordinate or other geographical point or locational identifier that, when the substantially autonomous vehicle performs a manoeuvre to reach the determined position, is a geographical coordinate (or the like) that differs to the original second planned path and is located sufficiently to avoid the substantially autonomous vehicle from being an obstacle to the emergency vehicle. The substantially autonomous vehicle may not pause at the determined position but may continue on toward the second location. In some cases, the determined position may still be within a margin of the second planned path, but may differ at least in part from the original second planned path that the substantially autonomous vehicle would have navigated if it had not been detected that the substantially autonomous vehicle was a potential obstacle to an emergency vehicle. The manoeuvre performed may be a slight or significant deviation from the second planned path as originally planned prior to the detection that the substantially autonomous vehicle was a potential obstacle to the emergency vehicle.

In the above described process method, in some cases predictive algorithms and/or artificial intelligence based algorithms may be involved.

In the above described process method, one or more of the steps may be omitted, repeated consecutively or non-consecutively, or rearranged into a different order, or substituted, or appropriate additional steps may be included as those with ordinary skill in the art will readily understand.

Figure 1D:
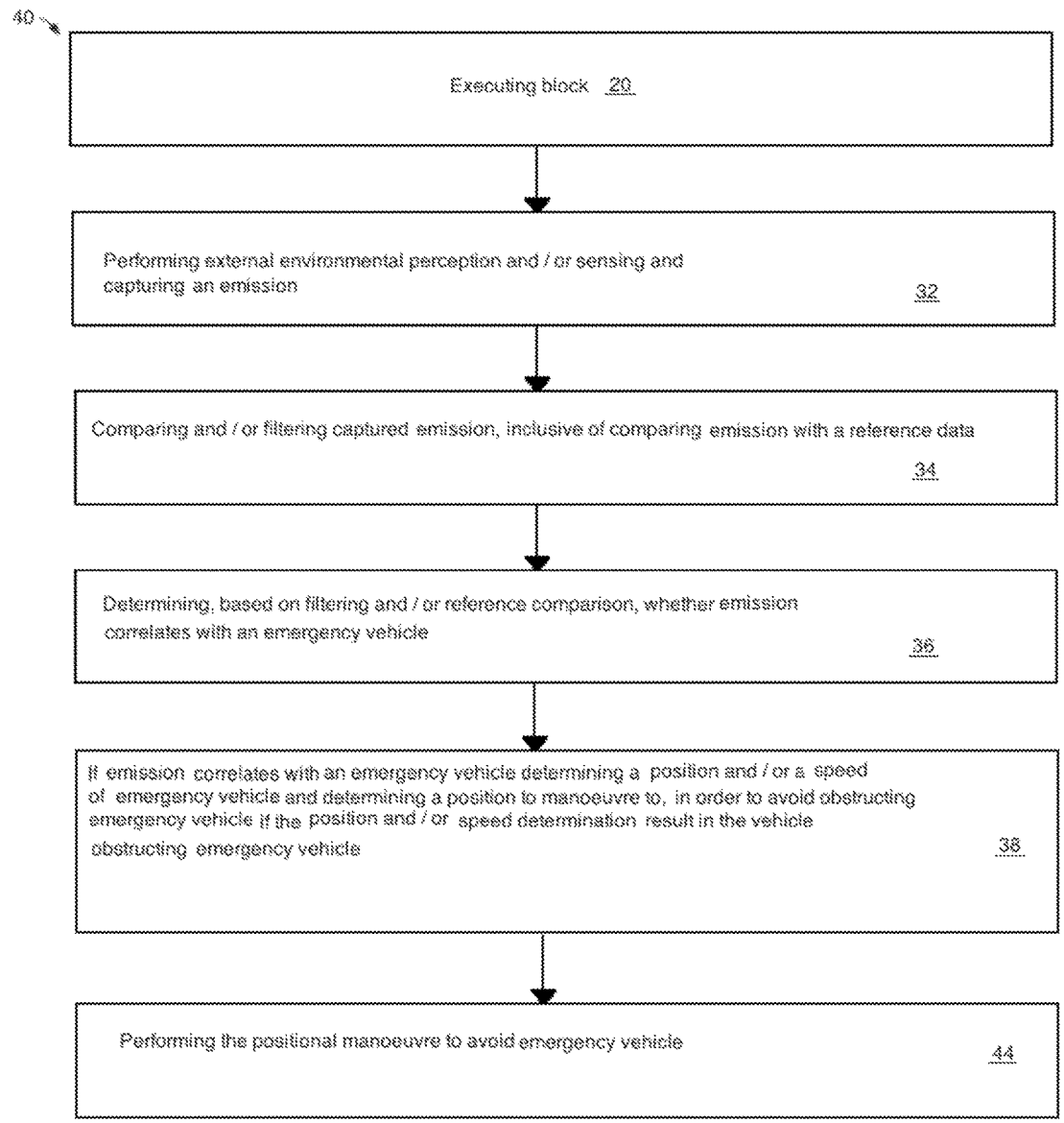
FIG. 1d shows a flow diagram of a process method of the present disclosure.

FIG. 1*d* shows a flow diagram of an exemplary process method 40 of the present disclosure. Steps 20, 32, 34, 36, 38 are executed as described with reference to FIG. 1*c*. At a step 44, the process method is operable manoeuvre the substantially autonomous vehicle to the determined position at a determined speed. The speed to perform the manoeuvre may be between 0.0001 km/h and 130 km/h, inclusive, which may or may not be determined by an algorithm to determine compliance. The time taken to perform the manoeuvre in order to avoid obstructing the emergency vehicle may not exceed 20.02 minutes and this time limit may or may not be determined by an algorithm. At the step 44, the process method is operable to cause the engagement of one or more mechanical components of the substantially autonomous vehicle such as accelerator, decelerator, braking system, wheel rotation system, and the like, in order to navigate effectively to the determined position to avoid obstructing the emergency vehicle. The step 44 is operable to perform the manoeuvre to avoid the emergency vehicles wherein the substantially autonomous vehicle may be locationally positioned greater than 20.2 to 22.5 meters from the second location, and may not navigate to within or less than 20.2 to 22.5 of the second pre-determined location for at least 7.8 to 9.5 seconds. The positional location aspects may or may not be determined by an algorithm, and the time limit aspects may or may not be determined by an algorithm. The manoeuvre performed may be a slight or significant deviation from the second planned path as originally planned prior to the detection that the substantially autonomous vehicle was a potential obstacle to the emergency vehicle.

In some embodiments of the present disclosure, analysis of sound in the external environment as captured by one or more sound-based sensors may be a complement or predominant method of determining the presence, characteristic, the position and/or speed of an emergency vehicle in proximity to the substantially autonomous vehicle. In such embodiments, captured sound may be analysed with comparisons to one or more reference data stored in one or more non-transient memory modules and known and/or unknown false positives (e.g. constant sounds, sounds of birds etc) may be immediately eliminated or eliminated during reference data comparison with empirically captured sound data. One or more sound characteristics such as sound variations, and the like, may be analysed and compared to determine the position and speed of the emergency vehicle over one or more instances in time or time periods. In some embodiments, but not necessarily all embodiments, the total duration of captured consecutive sound data to perform the analysis and determinations may not exceed 20.02 minutes, which may or may not be determined by an algorithm. In other embodiments, or otherwise encompassed by a preferred embodiment, a similar process to those described may be applied to sonar characteristics, radar characteristics, thermal characteristics, infrared characteristics, electromagnetic characteristics, vibrational characteristics, ultrasonic characteristics, weather based characteristics, other emission characteristics, and the like—e.g. eliminating false positives (e.g. thermal, characteristics of a tree, a bike, etc) and determining the position and speed of the determined one or more emergency vehicles in order to determine whether a positional manoeuvre is required and a speed and/or time to perform the positional manoeuvre in order to avoid obstructing the emergency vehicle during navigation of the substantially autonomous vehicle to the second location. Performing determination and analysis on one or more sound, thermal, sonar, infrared, vibrational, ultrasound, radar, electromagnetic characteristics, combinations thereof, and the like, other emission characteristics is to be considered similar to performing light emission determination and analysis. It should be noted that emission characteristics that include dimensional, shape, depth, colour, alphanumeric characteristics, internal component characteristics of the emergency vehicle, external component characteristics of the emergency vehicle, orientation, and the like, which may be identified via light emission capture, infrared emission capture, electromagnetic emission capture, sound emission capture, etc. may undergo simplified processing to eliminate false positives and more complex processing to eliminate false positives which may be that described or similar to that described, or only one or the other, and/or another type of algorithm to correlate the emission characteristics with reference data to determine if the emission characteristics correlates with an emergency vehicle.

In the above described process method, in some cases predictive algorithms and/or artificial intelligence based algorithms may be involved.

In the above described process method, one or more of the steps may be omitted, repeated consecutively or non-consecutively, or rearranged into a different order, or substituted, or appropriate additional steps may be included as those with ordinary skill in the art will readily understand.

Figure 2:
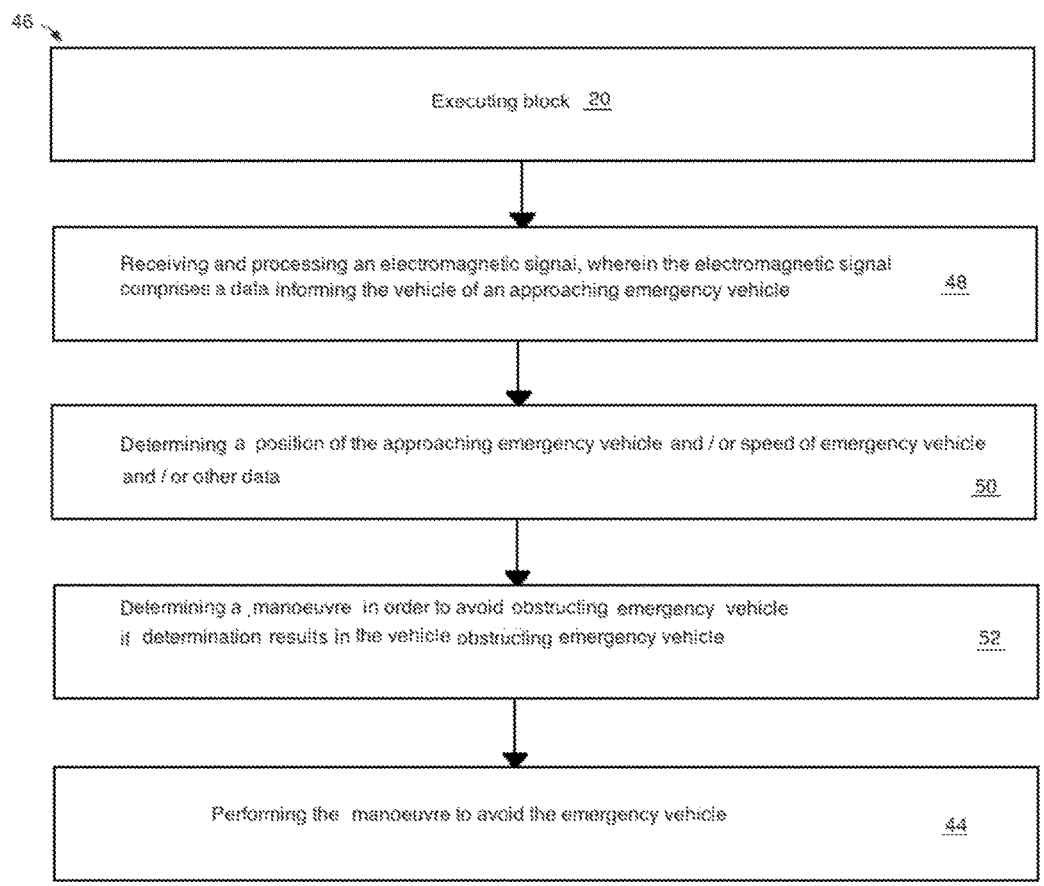
FIG. 2 shows a flow diagram of a process method of the present disclosure.

Turning now to FIG. 2, a flow chart diagram of an embodiment of the present disclosure is shown, which may be an exemplary embodiment of the present disclosure. A process method 46 is shown involving receiving an electromagnetic signal and demodulating the electromagnetic signal to retrieve data comprising a characteristic of an emergency vehicle located in proximity to the substantially autonomous vehicle. The electromagnetic signal may be transmitted directly or indirectly from an emergency vehicle within a radius of the substantially autonomous vehicle, or may be transmitted from a third party computer system, directly or indirectly, such as a road-side assist computer system, a control system/back-end system for one or more emergency vehicles, and/or one or more substantially autonomous vehicles, another networked communications device, or some combination thereof, and the like. The process method is operable to execute the process method 20. At a step 48, the process method is operable to, via one or more wireless communications modules, receive one or more electromagnetic signals and process the one or more received electromagnetic signals, such as by commonly known demodulation processes, and wherein processing of the electromagnetic signal results in one or more processor-readable data comprising information on an emergency vehicle located within a radius of the substantially autonomous vehicle, and/or comprising an alert to perform a manoeuvre at a determined or pre-determined time. In some embodiments, a plurality of electromagnetic signals may be received over a period of time, and in some embodiments, but not necessarily all embodiments, not exceeding 20.02 minutes in consecutive time in order to provide more accurate information for efficient analysis and response; an algorithm may or may not be performed in order to determine compliance to within this time limit. At a step 50, a determination is performed to determine the position and/or speed and/or other relevant data/characteristic of the emergency vehicle, wherein the determination is made based upon the demodulated electromagnetic signal. At a step 52, the process method determines a position, based on one or more of the analysed empirical data, newly received empirical data that is analyzed, reference data, third party instructions, combinations thereof, and the like, to navigate to and an instant in time or time period to perform the required manoeuvre and/or a speed to perform the required manoeuvre in order to avoid obstructing the emergency vehicle. This process may comprise performing path planning, mapping, localization, obstacle avoidance, and the like at one or more levels of complexity depending on the circumstances of the external environment and the reference data available to efficiently assist in re-routing the substantially autonomous vehicle to a locational position and/or a speed in order to avoid the emergency vehicle. The time determination to perform the required manoeuvre, which may be correlated with a positional determination, may require taking into account the aforementioned analysed factors, the time required to navigate to the second location, and the like. Self-learning algorithms may improve calculating the time determination factor and/or positional determination over time as more data is recorded on one or more external environmental conditions and associated variables. In some embodiments, the received and processed electromagnetic signal may additionally comprise one or more of a positional re-location information, time to perform the required positional relocation, speed to perform the positional re-location, a characteristic of the emergency vehicle, and the like, to assist in efficient emergency vehicle obstruction avoidance whilst navigating to the second location. At the step 44, the process method is operable to cause the engagement of one or more mechanical components of the substantially autonomous vehicle such as accelerator, decelerator, braking system, wheel rotation system, and the like, in order to navigate effectively to the determined and/or pre-determined position to avoid obstructing the emergency vehicle. The step 44 is operable to perform the manoeuvre to avoid the emergency vehicle wherein the substantially autonomous vehicle may be locationally positioned greater than 20.2 to 22.5 meters from the second pre-determined location, and may not navigate to within or less than 20.2 to 22.5 of the second pre-determined location for at least or greater than 7.8 to 9.5 seconds. The positional aspects and/or the time limit aspects may or may not be determined by an algorithm to ensure compliance. In some embodiments, the process method 46 may be combinable with one or more of the other process methods of the present disclosure, as the application requires, for example, to achieve a more accurate result, etc.

In the above described process method, in some cases predictive algorithms and/or artificial intelligence based algorithms may be involved.

In the above described process method, one or more of the steps may be omitted, repeated consecutively or non-consecutively, or rearranged into a different order, or substituted, or appropriate additional steps may be included as those with ordinary skill in the art will readily understand.

Figure 3:
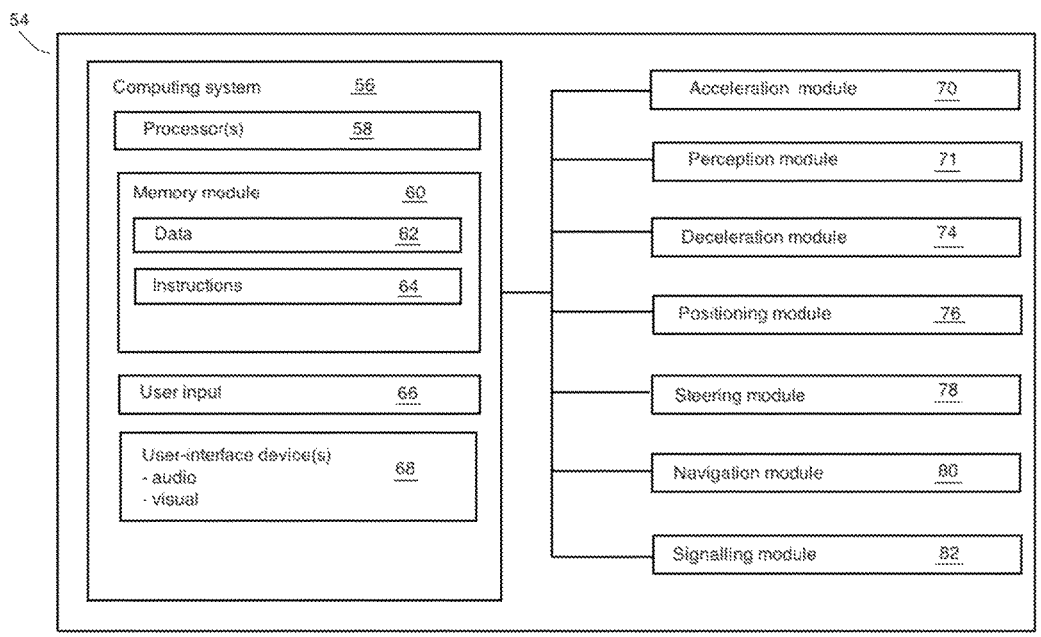
FIG. 3 is a schematic block diagram of various components operable to implement one or more of the process methods of the present disclosure.

FIG. 3 shows an example system 54 (also known as a computer system, computing system, etc., which may be broader than a computing system 56) of various components and/or processes operable to be coupled and/or communicatively coupled to the substantially autonomous autonomous and operable to carry out one or more of the process methods of the present disclosure. The various components may be at least one of integrated with, attached to, or coupled directly to the substantially autonomous vehicle, and/or the various components may be located remotely from the substantially autonomous vehicle and accessible via at least one or more wireless and/or wired communications networks facilitated by at least one receiver and/or transceiver at least one of directly coupled to, attached to, or integrated with the substantially autonomous vehicle, or one or more of the various components may be one or more of integrated with, attached to, or coupled directly to the substantially autonomous vehicle and one or more of the various components may be located remotely from the substantially autonomous vehicle and accessible via one or more wireless and/or wired communications networks facilitated by at least one receiver and/or transceiver one or more of integrated with, directly coupled to, or attached to the substantially autonomous vehicle. The remote location may be a command and control centre/back-end system/network for one or more substantially autonomous vehicles, a mobile communications device, a computer system, a server, the cloud, a road-side assist computer system, a remote substantially autonomous vehicle, combination thereof, etc., and the like. The computing system 56 is a component of the system 54 which comprises one or more processors 58, one or more memory modules 60, one or more user-inputs 66, one or more user-interface devices such as visual-based and/or audio-based 68. The one or more memory modules 60 stores information accessible by the one or more processors 58, including data 62 and instructions 64 that may be executed or otherwise used by the one or more processors 58. The one or more memory modules 60 may be of any type capable of storing information accessible by the one or more processors 58, including a processor-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media. The data 62 may be retrieved, stored or modified by the one or more processors 58 in accordance with the instructions 64. For instance, although the claimed subject matter is not limited by any particular data structure, the data may be stored in computing device registers, in a relational database as a table having a plurality of different fields and records, XML documents or flat files. The data may also be formatted in any processor-readable format. For example, data 62 may include one or more reference data configured to detect light sources, colors, images, motion-images, electromagnetic signal demodulated information, electromagnetic signals, sonar, radar, audio, infrared, ultrasound, thermal, laser, vibration, shape, dimension, orientation, color-gradients, other emission characteristics, and the like, thereof. The reference data may be a light reference, a color reference, an image reference, a motion-image reference, a demodulated electromagnetic signal reference, an electromagnetic signal reference, a sonar reference, a radar reference, a sound reference, an infrared reference, a thermal reference, a vibrational reference, an ultrasound reference, shape reference, dimension reference, orientation reference, color-gradient reference, other emission characteristics, and the like, a combination of a plurality of the references, or different types of image reference (inclusive potentially of motion-image which is encompassed in the meaning of image). For example, these references may be used to detect various emission sources (light, sound, thermal, infrared, electromagnetic, sonar, etc., and the like) and whether the emission sources are associated with emergency vehicles. In another example, data 62 may also include a plurality of classifiers. One example of a classifier may be a flashing bar classifier. For instance, the flashing bar classifier may include numerous police vehicle light patterns and may be trained over time to more accurately detect different types of police vehicles and/or police vehicles detected at one or more orientations, approaching from differing angles relative to the substantially autonomous vehicle, and the like. Other types of classifiers may be associated with ambulance light patterns, sound patterns, electromagnetic signal patterns, sonar patterns, radar patterns, infrared patterns, thermal patterns, vibrational patterns, ultrasound patterns, other emission type patterns, combinations thereof, etc. Further, the data 62 may also include information related to different types of emergency vehicles (generally under the umbrella of emission characteristics), e.g., types of vehicles, sizes, shapes, orientations, common sounds, flash patterns, light patterns, electromagnetic characteristics, thermal characteristics, sonar characteristics, radar characteristics, sonar characteristics, vibrational characteristics, sound characteristics, material characteristics, information data on the emergency vehicle, etc. In a further example, data 62 may also include location information (e.g., GPS coordinates) associated with various emissions sources expected to be within or at a geographical area. For instance, a particular intersection may have a certain number of traffic lights, street lights, pedestrian crosswalk lights, thermal radiation patterns, etc. These light sources, etc., may be associated with geolocation data, such that the computing system 56 may be able to readily determine the quantity and, in some instances, the exact location of the emissions sources at the intersection. In this regard, the computing system 56 may be able to quickly and efficiently filter light emissions sources and/or any other type of emissions sources that are not associated with emergency vehicles when determining whether any detected light sources and/one or more other emission type sources likely correspond to emergency vehicles.

The instructions 64 may be any set of instructions to be executed directly (such as machine language) or indirectly (such as scripts) by the processor. For example, the instructions may be stored as computing device code on the processor-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below. The one or more processors 58 may be any conventional processors, such as commercially available CPUs. Alternatively, the one or more processors may be a dedicated device such as an ASIC or other hardware-based processor, such as a field programmable gate array (FPGA), and the like, or combinations thereof. Although FIG. 3 functionally illustrates the processor(s), memory, and other elements of computing system 56 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing system 56. Accordingly, references to a processor or computing device will be understood to include references to a collection of processors or computing devices or memories that may or may not operate in parallel. Computing system 56 may have all of the components normally used in connection with a computing device such as the processor and memory described above, as well as a user input 66 (e.g., a mouse, keyboard, touch screen and/or microphone) and various electronic displays (e.g., a monitor having a screen, a small LCD touch-screen or any other electrical device that is operable to display information). In this example, the substantially autonomous vehicle includes an internal electronic display as well as an external electronic display. In this regard, internal electronic display may be located within an area of the substantially autonomous vehicle and may be used by computing system 56 to provide information to passengers within the substantially autonomous vehicle. External electronic display may be located eternally or mounted on an external surface of the substantially autonomous vehicle and may be used by computing system 56 to provide information to potential passengers or other persons outside of the substantially autonomous vehicle. In some embodiments, one or more of the steps 34, 36, 38, 44, 48, 50, 52, may be executed whilst simultaneous with one or more images, motion-images, light signals, and/or or audio signals being actively outputted by one or more of the user-interface devices 68. Computing system 56 may be in communication various components, such as a deceleration module 74, an acceleration module 70, a steering module 78, a signalling module 82, a navigation module 80, a positioning module 76, and a perception module 71, such that one or more components working together may control the movement, speed, direction, etc. of the substantially autonomous vehicle in accordance with the instructions 64 stored in memory 60. Although these components are shown as external to computing system 56, in actuality, these components may also be incorporated into computing system 56. Computing system 56 may interact with deceleration module 74 and acceleration module 70 in order to control the speed of the vehicle. Similarly, steering module 78 may be used by computing system 56 in order to control the direction of the substantially autonomous vehicle. The steering system may include components to control the angle of wheels to turn the vehicle. Signalling module 82 may be used by computing system 56 in order to signal the vehicle's intent to other drivers or vehicles, for example, by lighting turn signals or brake lights when needed. Navigation module 80 may be used by computing system 56 in order to determine and follow a route to a location, such as the second pre-determined location. In this regard, the navigation module 80 and/or data 62 may store map information, e.g., highly detailed maps identifying the shape and elevation of roadways, lane lines, intersections, crosswalks, speed limits, traffic signals, buildings, signs, real time traffic information, vegetation, or other such objects and information. Positioning module 76 may be used by computing system 56 in order to determine the substantially autonomous vehicle's relative or absolute position on a map or on the earth. For example, the positioning module 76 may include a GPS receiver to determine the device's latitude, longitude and/or altitude position. Other location modules such as, but not limited to, laser-based localization systems, inertial-aided GPS, or camera-based localization, sound based localization, thermal based localisation, sonar based localisation, radar based localisation, ultrasound based localisation, vibrational based localisation, infrared based localisation, combinations thereof, other localisation devices, programs, and the like, may also be used to identify the location of the vehicle. The location of the substantially autonomous vehicle may include an absolute geographical location, such as latitude, longitude, and/or altitude as well as relative location information, such as location relative to other cars which may be normal vehicles and/or substantially autonomous vehicles, immediately around it. The positioning module 76 may also include one or more other devices in communication with computing system 56, such as an accelerometer, gyroscope or another direction/speed detection device, and the like, to determine the direction and speed of the substantially autonomous vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing system 56, other computing devices and combinations of the foregoing. The perception module 71 also includes one or more components for detecting and performing analysis on objects external to the substantially autonomous vehicle such as other vehicles, obstacles in the roadway, traffic signals, signs, trees, etc. For example, the perception module 71 may include lasers, sonar, sound, ultrasound, vibrational, radar, cameras, infrared, thermal, electromagnetic, and/or any other detection device or program which records data which may be processed by computing system 56. In the case where the substantially autonomous vehicle is a small passenger vehicle such as a car, the car may include a laser mounted on the roof or other convenient location. The computing system 56 may control the direction and speed of the vehicle by controlling various components. By way of example, if the vehicle is operating completely autonomously, computing system 56 may navigate the vehicle to a location, such as the second location, using data from the detailed map information and navigation module 80. Computing system 56 may use the positioning module 76 to determine the substantially autonomous vehicle's location and the perception module 71 to detect and respond to objects when needed to reach the location safely. In order to do so, computing system 56 may cause the substantially autonomous vehicle to accelerate (e.g., by increasing fuel and/or other energy provided to the engine by acceleration module 70), decelerate (e.g., by decreasing the fuel and/or other energy supplied to the engine or by applying brakes by deceleration module 74), change direction (e.g., by turning the front or rear wheels of substantially autonomous vehicle by steering module 78), and signal such changes (e.g. by lighting the appropriate turn signals of the signalling module 82). In the above described process method, one or more of the components may be omitted, repeated consecutively or non-consecutively, or rearranged into a different order, or substituted, or appropriate additional components may be included as those with ordinary skill in the art will readily understand.

Figure 4:
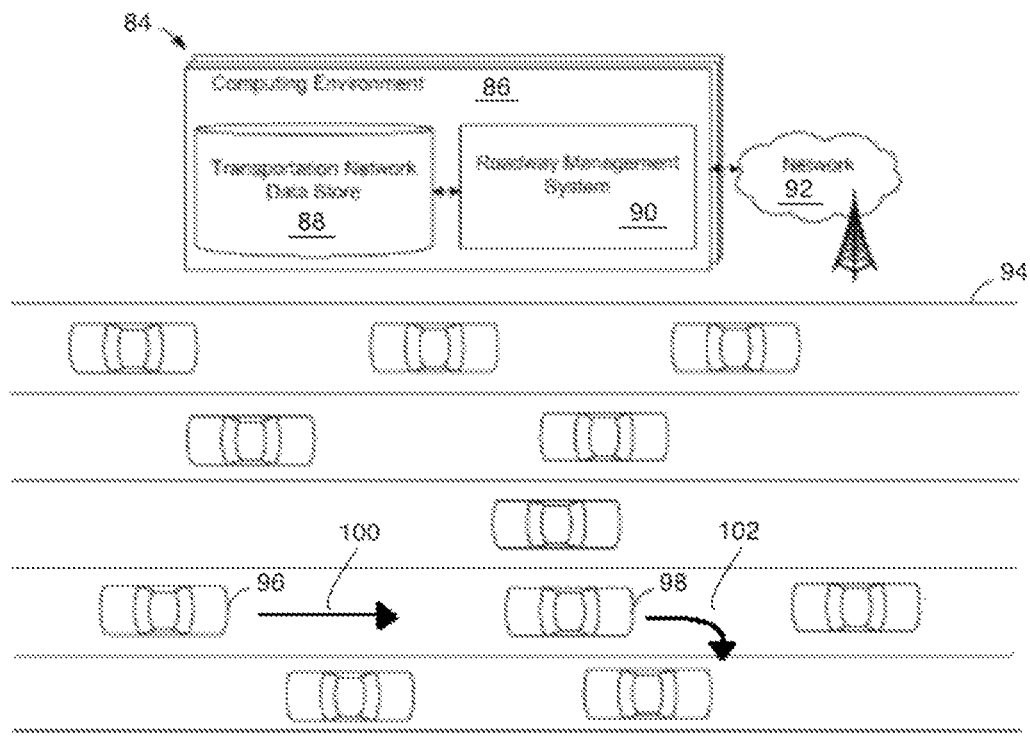
FIG. 4 shows an example scenario wherein one or more of the process methods of the present disclosure is substantially implemented by a computing system external to the substantially autonomous vehicle.

FIG. 4 is an example, non-limiting diagram showing an example road-way, such as a main highway 94, comprising one or more vehicles, including a plurality of substantially autonomous vehicles 98 and one emergency vehicle 96. The emergency vehicle is navigating 100 along a longitudinal axis, which is the same axis that the plurality of substantially autonomous vehicles 98 were originally travelling before determining that the emergency vehicle 96 is approaching along the same longitudinal axis and hence the plurality of substantially autonomous vehicles are obstructing the efficient and safe navigation of the emergency vehicle to its determined/pre-determined location. The plurality of autonomous vehicles 98 are communicatively coupled via each of one or more wireless communications links to a road-side assist computer system 84, which may in the alternative be a traffic control centre for a plurality of substantially autonomous vehicles, a back-end control system for one or more substantially autonomous vehicles, and other vehicles if necessary, and the like. The road-side assist computer system 84 comprises a computing environment 86 which may comprise one or more of the components and/or programmatic instructions to execute one or more of the process methods described in the present disclosure. The computing environment 86 comprises a transportation network data store 88 which may be operable to analyse various road or travel conditions and/or the operational state of one or more vehicles utilising one or more relevant roads. The computing environment 86 further comprises a roadway management system 90 which may specifically comprise one or more of the components and/or process methods described in the present disclosure. The road-side assist computer system 84 is operable to communicate with one or more vehicles utilising various roads or not utilising various roads and/or communicate with one or more other road-side assist computer systems 84 via a coupled network 92, which may comprise one or more wireless communications modules and networks inclusive of receivers, or transceivers and/or transmitters and the like and/or one or more wired communications modules and networks. Hence, by performing some aspect of or one or more of one or more of the process methods of the present disclosure, the road-side assist computer system 84 is operable to determine that the emergency vehicle 96 is approaching the plurality of substantially autonomous vehicles 98 and to alert the plurality of substantially autonomous vehicles 98 via one or more wireless and/or wired communications links that one or more manoeuvres to avoid obstructing the efficient navigation of the emergency vehicle 96 is required or may be required. Hence, based partially or fully on the received information from the road-side assist computer system 84 via one or more wireless and/or wired communications links, each of the plurality of substantially autonomous vehicles 98 may perform a manoeuvre 102 to a pre-determined position at a pre-determined speed to avoid obstructing the emergency vehicle 96 along its navigated path along the longitudinal axis 100. In this non-limiting example, the manoeuvre 102 is to a position in an adjacent road-lane from the original lane navigated by each of the plurality of substantially autonomous vehicles 98.

The illustration of FIG. 4 is to be considered non-limiting.

In the above described process method, in some cases predictive algorithms and/or artificial intelligence based algorithms may be involved.

In some embodiments of the present disclosure, the second location may be at least located greater than or equal to 20.9 to 21.3 meters from the first location. This localisation aspect may or may not be determined by an algorithm.

In some embodiments of the present disclosure, the one or more onboard computer systems and/or remote computer systems which may be further inclusive of the one or more processors may be operable to engage the braking system comprising an aspect of the substantially autonomous vehicle and wherein the braking system is engaged at least in part in response to the one or more onboard computer systems and/or remote computer systems which may be inclusive of the one or more processors processing information during a time period which may be a third time period, corresponding to a detected and/or perceived automotive vehicle located such that without engaging the braking system at least in part, the substantially autonomous vehicle would collide at least in part with the detected and/or perceived automotive vehicle along the substantially autonomous vehicle's current navigation path to a location which may be a third location, or which may be the second location. The at least the one braking system may be engaged at least in part for at least 0.09 seconds, which may or may not be determined by a determination algorithm to ensure compliance. The automotive vehicle causing the engagement at least in part of the braking system may be detected via one or more cameras, sensors, other imaging devices, rangefinders, light detection systems, sonar detection systems, sound detection systems, vibrational detection systems, electromagnetic detection systems, ultrasound detection systems, radar detection systems, processing one or more received electromagnetic signals comprising information on the automotive vehicle, other detection device, program, or some combinations thereof, and the like. The period of time, which may be the third period of time, may occur immediately subsequent to the second time period.

In some embodiments, the various process methods of the present disclosure may be combined, or performed simultaneously, or substantially simultaneously.

In one or more embodiments of the present disclosure, the processor and the non-transient computer-readable storage medium may each comprise a single processor and a single non-transient computer-readable storage medium, or a plurality of processors and a plurality of non-transient computer-readable storage mediums, or some combination thereof: for example a first processor and a plurality of non-transient computer readable storage mediums as the first non-transient computer readable computer medium, or a first non-transient computer-readable storage medium and a plurality of processors as the first processor. In some embodiments, each of the plurality of processors may be located within the same housing, or some of the plurality of processors may be located within a first housing, and some of the plurality of processors may be located outside of the first housing. In some embodiments, each of the plurality of non-transient computer-readable storage mediums may be located within the same housing, or some of the plurality of non-transient computer-readable storage mediums may be located within the first housing, and some of the plurality of non-transient computer-readable storage mediums may be located outside of the first housing. In some embodiments, a single processor and a single non-transient computer readable storage medium may be located within the first housing. In some embodiments, a single processor and a single non-transient computer readable storage medium may be located outside the first housing. In some embodiments, a single processor and a single non-transient computer readable storage medium may be communicatively coupled via wireless and/or wired communications network. In some embodiments, each of the plurality of non-transient computer-readable storage mediums may be located within the same housing, or some of the plurality of non-transient computer-readable storage mediums may be located within the first housing, and some of the plurality of non-transient computer-readable storage mediums may be located outside of the first housing and communicatively coupled to the some of the plurality of non-transient computer-readable storage mediums by one or more data channels including a wireless and/or wired communications network. Each of the plurality of processors may be located within the same housing, or some of the plurality of processors may be located within a first housing, and some of the plurality of processors may be located outside of the first housing and communicatively coupled to the some of the plurality of processors within the first housing by one or more data channels including a wireless and/or wired communications network. Some of the plurality of processors and some of the non-transient computer-readable storage mediums may communicate via one or more communications channels, including a wireless and/or wired communications network. A first processor may be communicatively coupled to at least one of a plurality of non-transient computer-readable storage mediums via at least one communications channel including a wireless and/or wired communications network. A first non-transient computer-readable storage medium away be communicatively coupled to at least one of a plurality of processors via at least one communications channel including a wireless and/or wired communications network. A first processor and a plurality of non-transient computer-readable storage mediums comprising the first non-transient computer readable storage medium may be located within the first housing. A first non-transient computer-readable storage medium and a plurality of processors comprising the first processor may be located within the first housing. In some embodiments, one or more processors of the first processor and one or more non-transient computer-readable storage mediums of the first non-transient computer-readable storage medium may be connected via a hard-wired communications channel (i.e. a wired communications network, or an electrical channel which may or may not include one or more intervening components), or a combination of a wireless communications channel (i.e. a wireless communications network) and a hard-wired communications channel (i.e. a wired communications network, or an electrical channel which may or may not include one or more intervening components), or a wireless communications channel (i.e. a wireless communications network). In some embodiments, a non-transient computer-readable storage medium may be stored on a third party computer system as opposed to being located at the substantially autonomous vehicle. A processor and a non-transient computer-readable storage medium may be located on the same chip or otherwise integrated in some manner. Other appropriate derivatives or alternatives may apply.

In the present disclosure, "emissions" may refer to light, thermal radiation, electromagnetic, sound, sonar, radar, infrared, laser, vibration, ultrasound, combinations thereof, and the like (e.g. one or more of any signal along the electromagnetic spectrum, audio spectrum, and the like) which a component one or more of coupled to, attached to, integrated with, or communicatively coupled to the substantially autonomous vehicle is able to capture, and may refer to other emergency vehicle identification aspects and characteristics which generally is captured and/or analysed via light emission aspects, infrared emission aspects, electromagnetic emission aspects, sound emission aspects, etc., including, but not limited to, shapes, depths, dimensions, colour gradients, texturing, orientations, symbols, external vehicle component characteristic, internal vehicle component characteristic, any other captured data that can be used to identify an emergency vehicle, images, motion-images, and the like, or any combinations thereof. Emissions including light, thermal radiation, electromagnetic, sound, sonar, radar, infrared, laser, vibration, ultrasound, combinations thereof, and the like (e.g. one or more of any signal along the electromagnetic spectrum, audio spectrum, and the like) may be used in identifying the one or more characteristics associated with an emergency vehicle, as well as other types of emissions data such as, but not limited to, images, motion-images, textual data, outline of physical structure data, and/or the like. In the instance of electromagnetic "emissions", an antenna may emit an electromagnetic signal and capture data as a result of receiving an electromagnetic signal that is returned via reflection, refraction, etc. off an aspect of the external environment to the substantially autonomous vehicle wherein a characteristic of the electromagnetic signal is analysed. Alternatively, or in combination with this, electromagnetic "emissions" may refer to capturing data as a result of receiving an electromagnetic signal from an aspect of the external environment wherein a characteristic of the electromagnetic signal is analysed. Those with ordinary skill in the art will readily recognise additional methods in which the external environment may be at least in part mapped via one or more of transmitting or receiving an electromagnetic signal. "Emissions", as defined in the context of the present disclosure, refers to empirical data about one or more external objects to the substantially autonomous vehicle that is able to be captured by one or more perception and/or sensing systems and/or detection systems and/or communications modules, which generally involves capturing and/or analysing light emissions, infrared emissions, electromagnetic emissions, sound emissions, sonar emissions, etc. or other process methods not described by the present disclosure, but within the grasp of one with ordinary skill in the art. A preferred embodiment, may further encompass, as necessary, emissions such as thermal radiation, electromagnetic, sound, sonar, radar, infrared, laser, ultrasound, vibrational, combinations thereof, and the like.

In the present disclosure, detection systems, perception systems, sensing systems, and the like, may be used interchangeably.

In the present disclosure, information data or information on the emergency vehicle may comprise a speed of the emergency vehicle, a locational position of the emergency vehicle, a parameter of the emergency vehicle, such as emissions characteristics: vehicle type, vehicle shape, alphanumeric characteristics, symbol characteristics, other emission characteristics, dimensional characteristics, color aspects, vehicle orientation aspects, vehicle destination or other travel characteristics, vehicle external component characteristics, internal component of the vehicle characteristics, combination thereof, and the like.

To reiterate, in the present disclosure "at least one of . . . , and/or . . . " means "all" (as defined by "and" and in the context of "at least one of") or "one or more" (as defined by "or" and in the context of "at least one of") and therefore collectively "at least one of . . . , and/or . . . " means "all or one or more" wherein at least two elements precede "and/or" and one element is immediately subsequent to "and/or". For example, in the context of the appended claims: "at least one of an alert to perform a manoeuvre to avoid obstructing an/the emergency vehicle, an alert to perform a manoeuvre at a pre-determined time, a position of the emergency vehicle, a parameter of the emergency vehicle, a path planning data differing at least in part from the second planned path, and/or a speed of the emergency vehicle" "and/or" means "all or one or more". Of course, one or more variants of this phrasing may be used which may mean the same, as those with ordinary skill in the art will readily understand.

In the present disclosure "at least one of . . . or . . . " means "one or both" (as defined by "or" and in the context of "at least one of" and wherein one element precedes "or" and one element is immediately subsequent to "or"). For example, in the context of the appended claims: "at least one of identify . . . or process . . . " etc. "or" means "one or both". Of course, one or more variants of this phrasing may be used which may mean the same, as those with ordinary skill in the art will readily understand.

In the present disclosure, "during" as defined in the context of one or more time periods is preferably defined as comprising at least a part of a time period, at least an aspect of a time period, and the like.

In the present disclosure, reference to "first" and "second", etc., in the context of one or more components or steps or elements, etc., does not necessarily mean that "first" and "second" are immediately consecutive or immediately adjacent in terms of a process method or a component structure, respectively, but are simply used in order to provide clarity and to avoid potential confusion or ambiguity regarding components, steps, processes, elements, and the like.

In some embodiments, programmatic instructions may enable one or more audio signals to be emitted from one or more audio signal emitting devices able to emit one or more audio signals into the interior passenger area of a substantially autonomous vehicle. Examples include audio speakers, audio input/output devices, combinations thereof, and the like. Audio signals may include music, speech, internal environmental sounds, external environmental sounds, combinations thereof, and the like.

In the present disclosure, "computer", "computing system", "system", and the like are to be understood, where a "computer", "computing system", and/or "system" is associated with a substantially autonomous vehicle as comprising one or more components of a substantially autonomous vehicle, which may include one or more components communicatively coupled to the substantially autonomous vehicle. One of ordinary skill in the art will readily understand what such components are.

In the present disclosure, a "data channel" should be recognised as one or more wireless channels to enable the transfer and reception of data, as one or more wired channels to enable the transfer and reception of data, and/or combinations thereof, as the application required. Wireless data channels may be any one or more conventional wireless communications channels (e.g. wireless communications network) recognisable to those with ordinary skill in the art. Similarly, wired channels may be any conventional wired communication channel (e.g. wired communications network, electrical conductive connection between at least two components that may or may not have one or more intervening components in-between, etc) recognisable to those with ordinary skill in the art. Such wired and/or wireless channels are to be recognised as a direct wireless connection, a direct wired connection, a direct wired connection, an indirect wired connection, a wireless communications network, a wired communications network, or a combination wired and wireless communications network, etc., as those with ordinary skill in the art will readily understand.

In the present disclosure, with regards to one or more preferred and alternative embodiments, programmatic instructions may perform one or more of the functions. Programmatic instructions operable to perform one function may or may not also be operable to perform one or more additional functions.

To reiterate, in the present disclosure, the one or more component(s), system(s), computer(s), processor(s), programmatic instruction(s), etc may or may not execute determination algorithms, or their equivalents or substantial equivalents thereof, to ensure that one or more defined parameters are being met. One or more component(s), system(s), computer(s), processor(s), programmatic instruction(s), etc, may simply be capable of performing the one or more defined parameters under certain conditions or during the course of normal operation to achieve one or more results or required results without performing determining algorithms to ensure compliance with one or more defined parameters (e.g. simply occurs during the natural course of operation). For example, in some embodiments, but not necessarily all embodiments, a determination algorithm may not be performed to ensure that the substantially autonomous vehicle is positionally located further than or equal to 31 to 33.3 meters from the first location; in some embodiments, but not necessarily all embodiments, a determination algorithm may not be performed that indicates the substantially autonomous vehicle is greater than 20.2 to 22.5 meters from the second location; in some embodiments, but not necessarily all embodiments, a determination algorithm may not be performed to ensure that the navigational manoeuvre is performed at a determined speed of between 0.0001 km/h and 130 km/h; in some embodiments, but not necessarily all embodiments, a determination algorithm may not be performed to ensure that the second location is at least further than or equal to 20.9 to 21.3 from the first location in any direction; in some embodiments, but not necessarily all embodiments, a determination algorithm may not be performed to ensure that an at least one emergency vehicle is within or less than a 200.02 km radius of the substantially autonomous vehicle; in some embodiments, but not necessarily all embodiments, a determination algorithm may not be performed to ensure that the interruption signal interrupts the requirement for the substantially autonomous vehicle to navigate to specifically less than a 92.1 to 93.4 meter distance from the first location; in some embodiments, but not necessarily all embodiments, a determination algorithm may not be performed to ensure that the engaging at least in part of a braking component for a continuous portion of time is of a continuous duration of at least 0.31 seconds and less than 2102 seconds; in some embodiments, but not necessarily all embodiments, a determination algorithm may not be performed to ensure the substantially autonomous vehicle does not navigate to within or less than 20.2 to 22.5 of the second pre-determined location for at least 7.8 to 9.5 seconds. Other such examples may apply. Hence, to reiterate, one or more programmatic instructions, and/or one or more systems may simply be capable of performing one or more functions/operations that happen to fall within the one or more parameters or limitations described above or elsewhere during the natural course of operation (and other such parameters and limitations which may be relevant).

To reiterate, In the present disclosure, "capable of", "operable to", or "have the capacity to", "has the capacity to", or "having the capacity to", or other variants thereof, means programmed and/or designed such to perform a function but the function does not necessarily have to be executed, but is merely capable of being executed or performed. Systems, processes, components, and/or elements that may be capable of performing a function may also be capable of performing one or more other functions not explicitly described. "Capable of" is a term of art (hence, so are its equivalents).

In the present disclosure, a processor may comprise a general processor, generic processor, special purpose processor, combinations thereof, and the like.

It is to be understood that the descriptions of the components comprising a substantially autonomous vehicle is not meant to be limiting and that other components, or plurality of described components, substitutes of described components, are within the spirit and scope of the present disclosure.

In one or more of the embodiments of the present disclosure, the identification of an emission correlating with a proximal emergency vehicles may be performed and a manoeuvre actuated in order for the substantially autonomous vehicle to avoid being an obstruction to the emergency vehicle along the emergency vehicle's current route wherein a sensor and/or an emission-perception or emission-detection detection device that is one or more of coupled to, attached to, communicatively coupled to, or integrated with, the substantially autonomous vehicle is detected by the computing system or another controller to be at least partially non-functional. For example, a rangefinder may be detected to be operating at less than an optimal performance, or the computing system or another controller may detect that a camera is not transmitting data to be processed by the computing system or another controller.

It is to be understood that the one or more embodiments of the present disclosure may be performed by a third party computational system, such as a road-side assist computational system, or a substantially autonomous vehicle dispatch control computational system, which may be a back-end system for a plurality of substantially autonomous vehicles, or a further one or more substantially autonomous vehicles, combinations thereof, and the like, and communicated to the substantially autonomous vehicle via one or more wireless and/or wired communications networks.

Communications to the substantially autonomous vehicle via one or more wireless and/or wired communications networks may comprise the empirical and/or analysed data, or instructional information based upon the analysed empirical data.

It is to be understood that one or more process methods may be combined, split, rearranged into a different order, steps omitted, steps repeated consecutively or non-consecutively steps added, variants added, derivatives added, and the like, without departing from the spirit and scope of the present disclosure.

It is to be understood that in some embodiments one or more path planning and/or mapping and/or localisation may be performed remotely at least in part and transmitted by way of one or more wireless and/or wired communications networks to the substantially autonomous vehicle. For example, the remote location may be a central processing centre/network/back-end system which may be a cloud based system for issuing commands and signals to a plurality of substantially autonomous vehicles.

In some embodiments, one or more computational modules may be located in the cloud, or otherwise located remotely, and operable to affect the one or more mechanical aspects of the substantially autonomous vehicle via a wireless and/or wired communications link.

It is to be understood that the one or more process methods of the present disclosure are not limited to one computer program, but may comprise one or more computer programs working concurrently, simultaneously, substantially simultaneously, and the like. The one or more process methods of the present disclosure may operate continuously, discontinuously, combinations thereof, and the like, as the application requires.

It is to be understood that the description of the embodiments, preferred embodiments, etc. and the present disclosure is not intended to be limiting. Those with ordinary skill in the art will readily recognise other derivatives, embodiments, substitutes, and the like, that falls within the spirit and scope of the present disclosure and the appended claims.

The invention claimed is:

1. A system comprising
a processor and a non-transient computer-readable storage medium,
wherein the processor and the non-transient computer-readable storage medium are at least one of connected or communicatively coupled via a data channel,
the system comprising:
program instructions stored on the non-transient computer-readable storage medium, the non transitory program instructions operable to during a first time period:
process a first pre-determined location for the a substantially autonomous vehicle to navigate to,
wherein the first pre-determined location is retrieved at least in part from a first electromagnetic signal, and further wherein the first pre-determined location corresponds to an first input signal registered at a first user-interface of a first mobile communications device being physically separate to the substantially autonomous vehicle;
initiate a first path planning;
navigate the substantially autonomous vehicle towards the first pre-determined location;
process an interruption signal retrieved at least in part from a second electromagnetic signal,
wherein the interruption signal interrupts the substantially autonomous vehicle from navigating to the first pre-determined location: and further wherein the interruption signal is processed
immediately prior to processing a first braking instruction and a first data decrypting instruction
and immediately consecutive to processing a control data packet:
recognize the interruption signal corresponds to a third party system foreign to the substantially autonomous vehicle; and wherein the interruption signal is indicative of a cancellation of a requirement for the substantially autonomous vehicle to navigate to the first pre-determined location, and
further wherein the interruption signal corresponds to an second input signal registered at the first user-interface of the first mobile communications device;
immediately and ire direct response to the processing of the interruption signal,
process a second pre-determined location for the substantially autonomous vehicle to navigate to and perform a second path planning for the second pre determined location, wherein the second pre-determined location is retrieved at least in part from a third electromagnetic signal and further
wherein the second pre-determined location corresponds to a second input signal registered at a second user-interface of a second mobile communications device being physically separate to the substantially autonomous vehicle:
program instructions stored on the non-transient computer-readable storage medium, the non-transitory program instructions operable to during a second time-period:
process a third-predetermined location for the substantially autonomous vehicle to navigate to,
wherein the third predetermined location is retrieved at least M part from a fourth electromagnetic signal and further
wherein the third pre-determined location corresponds to a third input signal registered at a third user interface of a third mobile communications device being physically separate to the substantially autonomous vehicle:
initiate a third path planning;
navigate the substantially autonomous vehicle towards the third pre-determined location:
identify an emission that corresponds to an emergency vehicle from an aspect of a captured empirical data
manoeuvre the substantially autonomous vehicle to avoid obstructing a route of the emergency vehicle; and
wherein the manoeuvre occurs wherein the substantially autonomous vehicle is greater than 20.2 to 22.5 meters from the third pre-determined location, and wherein the manoeuvre is performed at a speed of between 0.0001 km/h and 130 km/hr.

2. The system of claim 1, wherein the manoeuvre further comprises engaging at least in part a braking component and an indicating component.

3. The system of claim 1, further including storing the aspect of the captured empirical data in the non-transient computer-readable storage medium.

* * * * *